United States Patent
Becker et al.

(10) Patent No.: US 12,343,229 B2
(45) Date of Patent: Jul. 1, 2025

(54) END CUT OF ENDODONTIC BRUSH

(71) Applicant: MDT MICRO DIAMOND TECHNOLOGIES LTD., Afula (IL)

(72) Inventors: Arie Becker, Kibbutz Afikim (IL); Zvika Gulkarov, Petah Tikva (IL)

(*) Notice: Subject to any disclaimer, the term of this patent is extended or adjusted under 35 U.S.C. 154(b) by 333 days.

(21) Appl. No.: 17/909,992

(22) PCT Filed: Mar. 7, 2021

(86) PCT No.: PCT/IL2021/050248
§ 371 (c)(1),
(2) Date: Sep. 8, 2022

(87) PCT Pub. No.: WO2021/181378
PCT Pub. Date: Sep. 16, 2021

(65) Prior Publication Data
US 2023/0109107 A1  Apr. 6, 2023

Related U.S. Application Data

(60) Provisional application No. 63/108,363, filed on Nov. 1, 2020, provisional application No. 62/988,453, filed on Mar. 12, 2020.

(51) Int. Cl.
*A61C 5/40* (2017.01)
*A46D 9/02* (2006.01)

(52) U.S. Cl.
CPC . *A61C 5/40* (2017.02); *A46D 9/02* (2013.01)

(58) Field of Classification Search
CPC ....... A61C 3/005; A61C 3/02; A61C 5/40–46; A61C 5/60; A46D 9/02
See application file for complete search history.

(56) References Cited

U.S. PATENT DOCUMENTS 1,369,112 A   2/1921  Truman
1,771,182 A * 7/1930  Lentulo .................... A61C 5/50
                                                        433/164

(Continued)

FOREIGN PATENT DOCUMENTS

RU       186960 U1    2/2019
WO    2021028907 A1   2/2021

OTHER PUBLICATIONS

Nguyen, T.A.; Kim, Y.; Kim, E.; Shin, S.-J.; Kim, S. Comparison of the Efficacy of Different Techniques for the Removal of Root Canal Filling Material in Artificial Teeth: A Micro-Computed Tomography Study. J. Clin. Med. 2019, 8, 984. https://doi.org/10.3390/jcm8070984.

(Continued)

*Primary Examiner* — Edward Moran
*Assistant Examiner* — Matthew P Saunders

(57) ABSTRACT

In some embodiments, the distal end of an endodontic brush unevenly (e.g., not along a line perpendicular to the axis of the brush). Optionally, the uneven strands will contact the walls of a channel more evenly and/or will have an increased stirring effect than an evenly cut end may be cut using an abrasive cutter (e.g., a grinding wheel) and/or a laser and/or an electrical discharge machining (EDM) cutter. Optionally, a grinding wheel will rotate opposite the winding of the wire. Optionally, a round end may be formed on the wire. In some embodiment, a coupling between an endodontic brush and a handpiece in configured to be held rotationally top the handpiece by friction and/or locked longitudinally into the handpiece by an interference element. In some embodiments, an edge of the brush is roughened. Optionally, the brush may be bent and/or eccentric.

12 Claims, 29 Drawing Sheets

(56) References Cited

U.S. PATENT DOCUMENTS

| | | | |
|---|---|---|---|
| 4,781,588 | A | 11/1988 | Granier |
| 5,453,008 | A | 9/1995 | Berlin |
| 5,836,764 | A | 11/1998 | Buchanan |
| 6,132,444 | A | 10/2000 | Shturman et al. |
| 8,597,313 | B2 | 12/2013 | Thatcher et al. |
| 8,628,551 | B2 | 1/2014 | Hanson et al. |
| 8,647,116 | B2 | 2/2014 | Becker et al. |
| 8,790,116 | B2 | 7/2014 | Becker et al. |
| 9,271,740 | B2 | 3/2016 | Scianamblo |
| 9,585,731 | B2 | 3/2017 | Becker et al. |
| 9,931,179 | B2 | 4/2018 | Rouiller |
| 10,363,615 | B2 | 7/2019 | Scianamblo |
| 2007/0099149 | A1* | 5/2007 | Levy ............... A61C 5/42 433/102 |
| 2010/0105004 | A1* | 4/2010 | Levy ............... A61C 5/42 433/102 |
| 2014/0004479 | A1 | 1/2014 | Rouiller |
| 2014/0045142 | A1* | 2/2014 | Becker ............ A61C 5/42 433/102 |
| 2018/0177568 | A1 | 6/2018 | Breguet et al. |

OTHER PUBLICATIONS

Root canal shaping with latest generation expanding instruments Autori: Francesco Bellucci Emanuele Ambu https://www.zerodonto.com/en/2017/12/root-canal-shaping-expansion-endoshaper-endofinisher/.

* cited by examiner

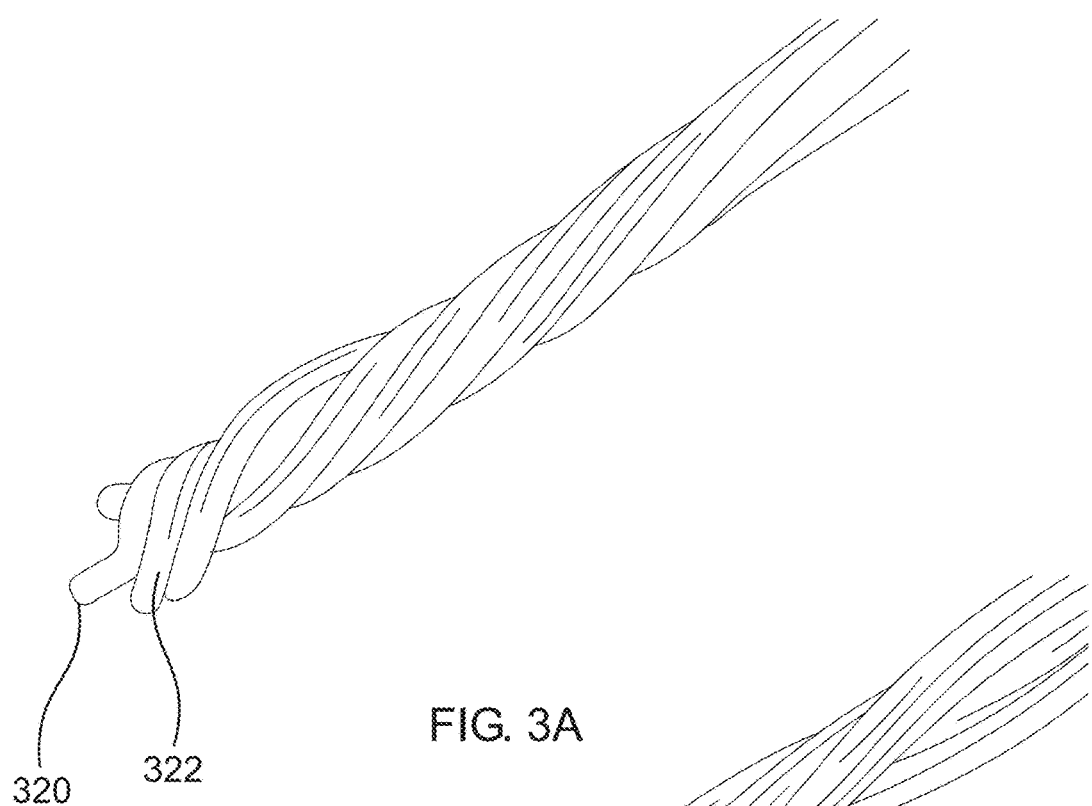
FIG. 3A
FIG. 3B
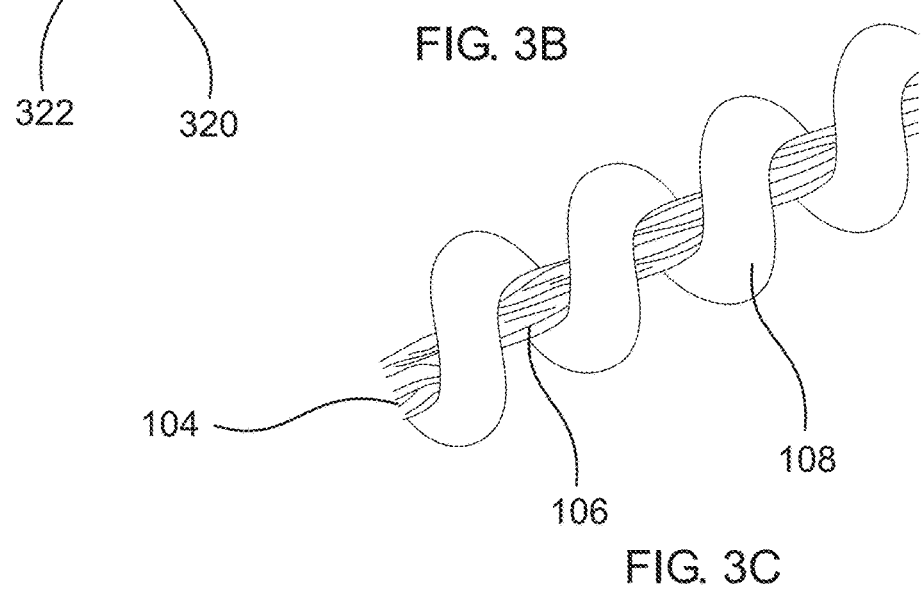
FIG. 3C

END CUT OF ENDODONTIC BRUSH

RELATED APPLICATION/S

This application claims the benefit of priority under 35 USC § 119(e) of U.S. Provisional Patent Application No. 63/108,363 filed Nov. 1, 2020, the contents of which are incorporated herein by reference in their entirety.

This application claims the benefit of priority under 35 USC § 119(e) of U.S. Provisional Patent Application No. 62/988,453 filed Mar. 12, 2020, the contents of which are incorporated herein by reference in their entirety.

FIELD AND BACKGROUND OF THE INVENTION

The present invention, in some embodiments thereof, relates to an endodontic brush and, more particularly, but not exclusively, improved forming of the distal end of thereof.

U.S. Pat. No. 8,790,116 with inventors overlapping the present application appears to disclose, "An endodontic file (10) has at least a central longitudinal cord (12), a helically wound wire (14) at least partially surrounding the cord and an elastomeric grip (16) partially covering the helically wound wire near a first end thereof and having an outer diameter that is slightly wider than an internal diameter of a barrel of a dental instrument whereby on insertion into the barrel it is supported therein only by friction."

U.S. Pat. No. 9,585,731 appears to disclose that "An endodontic file (10) has a handle (11) and a spiral cord (15) of helically wound metallic wire wound in a predetermined direction around a central metallic cord (13) formed between opposite ends of the central cord so as to form an integrated structure (18) of generally conical cross-section including a narrow tip end (17) and an opposite wider upper end (16) supported at the upper end by the handle. A flexible conical reinforcement (26, 31) supported by the handle covers an outermost layer of an upper portion of the spiral cord remote from the tip end, its lower end being of sufficiently low diameter to enter the root canal and dimensioned at its upper end to limit bending of the upper portion. An outer surface (20) of the spiral cord is configured for removing material from inside the root canal when the endodontic file is rotated in the predetermined direction."

U.S. Pat. No. 8,647,116 appears to disclose that "An endodontic file (10) has at least a central longitudinal cord (12), a helically wound wire (14) at least partially surrounding the cord and an elastomeric grip (16) partially covering the helically wound wire near a first end thereof and having an outer diameter that is slightly wider than an internal diameter of a barrel of a dental instrument whereby on insertion into the barrel it is supported therein only by friction."

U.S. Patent Publication no. 20140004479 appears to disclose, "An endodontic instrument for drilling the root canals of a tooth. The instrument comprises a working area for forming and/or shaping and/or cutting the wall of the root canal of the tooth. The working area is provided with a supporting endpiece that can be attached to a manual or mechanically driven mounting. The working area is arranged so as to assume a stowed configuration when the instrument is in an inoperative position to the working position, and vice versa, being cause by a predetermined variation in the temperature of the instrument. To this end, the working area is made from a wire of a metal alloy having shape-memory properties or particular elasticity properties."

U.S. Pat. No. 9,931,179 appears to disclose, "A method of forming a dental tool or instrument having a memorized shape. The method comprises selecting a nitinol wire having an initial transition temperature below room temperature; grinding the nitinol wire to form the dental tool or instrument so as to have a shank, located adjacent a first end, and a working area, with at least one cutting edge, located adjacent an opposite second leading end; molding the working area into a molded shape having at least one protrusion formed therein; heating the dental tool or instrument to both: a) alter the initial transition temperature of the dental tool or instrument to a final transition temperature, and b) memorize the Molded shape including the at least one protrusion so that the dental tool or instrument will automatically return to the molded shape having the at least one protrusion when at a temperature at or above the final transition temperature."

Tuan Anh Nguyen, Yaelim Kim, Euiseong Kim, Su-Jung Shin and Sunil Kim; Comparison of the Efficacy of Different Techniques for the Removal of Root Canal Filling Material in Artificial Teeth: A Micro-Computed Tomography Study, J. Clin. Med. 2019, 8(7), 984; https://doi.org/10.3390/jcm8070984. Appear to disclose a "Study aimed to assess the efficacy of canal filling material removal using three different techniques after filling with a Gutta-Percha (GP) cone and calcium silicate-based sealer, by measuring the percentage of volume debris of GP and sealer remaining intracanal with micro computed tomography (micro-CT). The filling material was removed from 30 plastic teeth by a nickel-titanium (Ni—Ti) rotary retreatment system. Final irrigation was performed with 2 mL of saline and 10 specimens were randomly allocated to a conventional group. In the passive ultrasonic irrigation (PUI) group, ultrasonic irrigation was added to the conventional group (n=10). In the Gentlefile Brush (GF Brush) group, irrigation with GF Brush was added to the conventional group (n=10). Remaining filling material was measured using micro-CT imaging analysis. The total mean volume of residual filling material after retreatment in the conventional group, PUI group and GF Brush group were 4.84896 mm3, 0.80702 mm3, and 0.05248 mm3, respectively. The percentage of filling material remaining intracanal was 6.76% in the conventional group, 1.12% in the PUI group and 0.07% in the GF Brush group. This study shows that the cleaning effect of the GF Brush system is superior to those of Ni—Ti retreatment files and the PUI system in the apical area."

Additional background art includes Francesco Bellucci and Emanuele Ambu, Root canal shaping with the latest generation of expanding instruments, *Endodontics*, 4 Dec. 2017.

SUMMARY OF THE INVENTION

According to an aspect of some embodiments of the invention, there is provided an endodontic brush including: a coupler for coupling to a handpiece; central longitudinal flexible core supported at a handpiece end by the coupler; and a tip of the core including a plurality of strands being wound in a winding direction and unbonded so that during use when the brush is rotated in a direction opposite to the winding direction the strands unwind and open to form a brush, and wherein the tip is cut unevenly.

According to some embodiments of the invention, the plurality of strands surrounds an inner central flexible cable.

According to some embodiments of the invention, the endodontic brush further includes a helical wire at least partially surrounding the core and extending toward a tip of the core opposite the handle end and wherein the tip protrudes beyond the helical wire at the tip.

According to some embodiments of the invention, a surface of the helical wire is roughened.

According to some embodiments of the invention, a distal portion of the helical wire is stretched longitudinally and narrowed laterally.

According to some embodiments of the invention, winding on a distal portion of the helical wire is loosened compared to an intermediate portion thereof.

According to some embodiments of the invention, winding on a distal portion of the helical wire is oriented parallel to the longitudinal flexible core.

According to some embodiments of the invention, an intermediate portion of the endodontic brush is bent.

According to some embodiments of the invention, an intermediate portion of the endodontic brush is bent.

According to some embodiments of the invention, the strands are wound in an opposite sense to the helical wire so that rotating the brush in the winding direction of the helical wire both tightens the helical wire and unwinds the strands.

According to some embodiments of the invention, the strands are wound in the same sense as the helical wire so that rotating the brush in the winding direction of the helical wire both tightens the helical wire and the strands and rotating the brush in the unwinding direction of the helical wire both unwinds the helical wire and the strands.

According to some embodiments of the invention, the tip is cut along a line directed at an angle of between 10 to 80 degrees to an axis of the core.

According to some embodiments of the invention, the tip is cut along a line directed at an angle of between 25 to 75 degrees to an axis of the core.

According to some embodiments of the invention, the tip is cut using an abrasive cutter.

According to some embodiments of the invention, the tip is cut using a laser cutter.

According to some embodiments of the invention, the tip is cut using an electrical discharge machining (EDM) cutter.

According to some embodiments of the invention, the tip is cut along a line directed at an acute angle to an axis of the core.

According to some embodiments of the invention, the coupler is configured to lock to the handpiece in a longitudinal direction and wherein rotational coupling between the coupler and the handpiece is via friction.

According to some embodiments of the invention, an intermediate portion of the brush includes a roughened edge.

According to some embodiments of the invention, a proximal portion of the flexible core is bent inside the coupler.

According to some embodiments of the invention, an intermediate portion of the brush in roughened.

According to an aspect of some embodiments of the invention, there is provided a method of manufacturing an endodontic brush including: supplying a coupler for coupling to a handpiece; winding a plurality of strands in a winding direction to form a flexible core; supporting the flexible core at a handpiece end by the coupler, a tip of the core opposite the handpiece end unbonded so that during use when the brush is rotated in a direction opposite to the winding direction the strands unwind and open to form a brush; and cutting the tip is cut unevenly.

According to some embodiments of the invention, the winding is around an inner central flexible cable.

According to some embodiments of the invention, the method further includes helically winding a wire at least partially around the core and extending toward a tip of the core opposite the handle end and wherein an unbonded portion of the core protrudes beyond the helical wire at the tip.

According to some embodiments of the invention, cutting is along a line directed at an acute angle to an axis of the core.

According to some embodiments of the invention, the cutting is along a line directed at an angle of between 10 to 80 degrees to an axis of the core.

According to some embodiments of the invention, the cutting is along a line directed at an angle of between 25 to 75 degrees to an axis of the core.

According to some embodiments of the invention, the cutting is via an abrasive cutter.

According to some embodiments of the invention, the cutting is via a laser cutter.

According to some embodiments of the invention, the cutting is via an electrical discharge machining (EDM) cutter.

According to an aspect of some embodiments of the invention, there is provided an endodontic brush including: a coupler for coupling to a handpiece; central longitudinal flexible core supported at a handpiece end by the coupler; a tip of the core including a plurality of strands being wound in a winding direction and unbonded so that during use when the brush is rotated in a direction opposite to the winding direction the strands unwind and open to form a brush; and a helical wire at least partially surrounding the core and extending toward a tip of the core opposite the handle end and wherein the tip protrudes beyond the helical wire at the tip and wherein a surface of the helical wire is roughened.

According to some embodiments of the invention, a distal portion of the helical wire is stretched longitudinally and narrowed laterally.

According to some embodiments of the invention, winding on a distal portion of the helical wire is loosened compared to an intermediate portion thereof.

According to some embodiments of the invention, winding on a distal portion of the helical wire is oriented parallel to the longitudinal flexible core.

According to some embodiments of the invention, an intermediate portion of the endodontic brush is bent.

According to some embodiments of the invention, an intermediate portion of the endodontic brush is bent.

According to some embodiments of the invention, a proximal portion of the flexible core is bent inside the coupler.

According to an aspect of some embodiments of the invention, there is provided an endodontic file including: a proximal handle configured for attachment to a dental handpiece to rotate around an axis of rotation the handle having a mean center of mass; a curved body including: a central core and a spiral wire winding around the core.

According to some embodiments of the invention, the central core includes a bundle of strands.

According to some embodiments of the invention, a distal portion of the core is free allowing the strands to spread to form a brush.

According to some embodiments of the invention, a width of each of the strands ranges between 5/100 to ¹/₁₀ mm.

According to some embodiments of the invention, a width of the core ranges between ¹/₁₀ to 8/10 mm.

According to some embodiments of the invention, a width of the spiral wire ranges between ¹/₁₀ to 6/10 mm.

According to some embodiments of the invention, the endodontic file further includes a distal brush portion.

According to some embodiments of the invention, a geometry of the file is eccentric.

According to some embodiments of the invention, a geometry of the file is serpentine.

According to an aspect of some embodiments of the invention, there is provided an endodontic file including: a proximal handle configured for attachment to a dental handpiece to rotate around an axis of rotation the handle having a mean center of mass; a transition section distal to the handle wherein a distance between the axis of rotation and an unstressed local center of mass of the file increases distally; a distal section, from the transition section to a distal tip, wherein an unstressed local center of mass of the distal section is constantly on the same side of the axis of rotation and a distance between the axis of rotation and an unstressed local center of mass of the distal section is greater than the a distance between the center mass of the handle and the axis of rotation.

According to some embodiments of the invention, a coefficient of variation of the distance between an unstressed local center of mass of the file in the distal section is less than one half.

According to some embodiments of the invention, the distance between an unstressed local center of mass of the file everywhere in the distal section is less than twice the distance between the center mass of the handle and the axis of rotation.

According to some embodiments of the invention, a length of the transition section is less than ⅕ the total length of the file.

According to some embodiments of the invention, the endodontic file further includes: a flexible cleaning rod protruding distally from the handle and wherein the transition section and the distal section are within the flexible cleaning rod.

According to some embodiments of the invention, a flexibility of the flexible cleaning rod increases distally.

According to some embodiments of the invention, the flexible cleaning rod includes an inner wire core and a spiral wire wrapped around the inner core. According to some embodiments of the invention, the flexible cleaning rod further includes an outer spiral wrapping wrapped around the spiral wire.

According to some embodiments of the invention, the outer spiral wrapping has a rough surface for cleaning the inside of an endodontic canal.

According to an aspect of some embodiments of the invention, there is provided a kit for endodontic cleaning including: a sterile eccentric endodontic file including a proximal handle configured for attachment to a dental handpiece to rotate around an axis of rotation the handle having a mean center of mass and a flexible cleaning rod having a distal active section configured for rotating inside an endodontic canal to cleaning the inside of the canal; the cleaning rod distal to the handle wherein a distance between the axis of rotation and an unstressed local center of mass of the distal active section is greater than half the radius of the handle; and a sterile packaging preserving the sterility of the sterile eccentric endodontic file.

According to some embodiments of the invention, the distance between the axis of rotation and the unstressed local center of mass of the distal active section is greater than a radius of the handle.

According to some embodiments of the invention, the flexible cleaning rod includes an inner wire core and a spiral wire wrapped around the inner core.

According to some embodiments of the invention, the flexible cleaning rod further includes an outer spiral wrapping wrapped around the spiral wire. According to some embodiments of the invention, the outer spiral wrapping has a rough surface for cleaning the inside of the canal.

According to some embodiments of the invention, the handle has a mean center of mass, the sterile eccentric endodontic file further including: a transition section distal to the handle and proximal to the active section wherein a distance between the axis of rotation and an unstressed local center of mass of the file increases distally; wherein the active section extends from the transition section to a distal tip, wherein an unstressed local center of mass of the active section is constantly on the same side of the axis of rotation and a distance between the axis of rotation and an unstressed local center of mass of the active section is greater than the a distance between the center mass of the handle and the axis of rotation.

According to an aspect of some embodiments of the invention, there is provided a method of production of an endodontic file including: providing a sterile eccentric endodontic file including a proximal handle configured for attachment to a dental handpiece to rotate around an axis of rotation the handle having a mean center of mass and a flexible cleaning rod having a distal active section configured for rotating inside an endodontic canal to cleaning the inside of the canal; the cleaning rod distal to the handle wherein a distance between the axis of rotation and an unstressed local center of mass of the distal active section is greater than half the radius of the handle; and sterilizing the eccentric endodontic file; and packing the endodontic file in a sterile state in a sterility preserving packaging.

According to some embodiments of the invention, the distance between the axis of rotation and the unstressed local center of mass of the distal active section is greater than a radius of the handle.

According to some embodiments of the invention, the flexible cleaning rod includes an inner wire core and a spiral wire wrapped around the inner core.

According to some embodiments of the invention, the flexible cleaning rod further includes an outer spiral wrapping wrapped around the spiral wire. According to some embodiments of the invention, the outer spiral wrapping has a rough surface for cleaning the inside of the canal.

According to an aspect of some embodiments of the invention, there is provided a method of cleaning an endodontic canal including: connecting an eccentric flexible endodontic file to a dental handpiece rotating the file to produce spreading of a distal section of the file.

According to an aspect of some embodiments of the invention, there is provided a method of cleaning an endodontic canal including: connecting a proximal handle of an eccentric flexible endodontic file to a dental handpiece spreading a distal portion of the file in a whipping motion by rotating of a proximal handle of the file.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 3A and 3B illustrate and embodiment of an endodontic brushes cut with a shearing clipper;

FIGS. 3C and 3D illustrate portions of endodontic brushes cut with an abrasive cutter in accordance with an embodiment of the current invention;

DESCRIPTION OF SPECIFIC EMBODIMENTS OF THE INVENTION

Figure 1A:
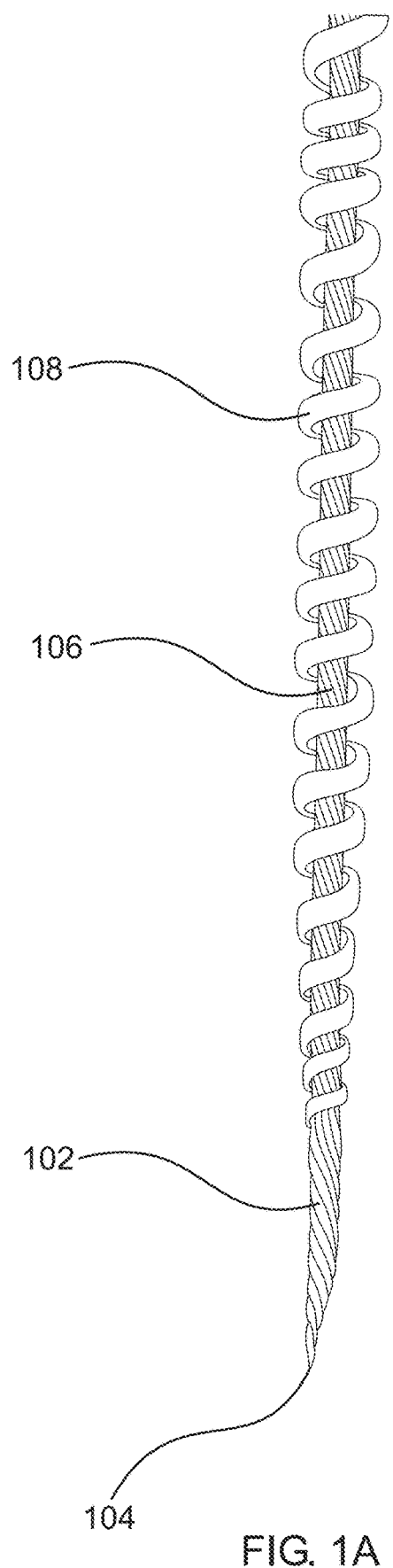
FIG. 1A illustrates an unevenly cut distal end of an endodontic brush in a closed configuration in accordance with an embodiment of the current invention.

The present invention, in some embodiments thereof, relates to an endodontic brush and, more particularly, but not exclusively, improved forming of the distal end of thereof.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Overview

An aspect of some embodiments of the current invention relates to cutting the distal end of an endodontic brush unevenly (e.g., not along a line perpendicular to the axis of the brush). Optionally, when the strands of the brush spread, each strand will contact the walls of a channel at different locations from the other strands. Optionally, when the strands of the brush do not spread, for example, when being used in a narrow channel, an uneven end of the brush will have an increased stirring effect of fluids in the channel in comparison than an evenly cut end. Separating the locations where different strands of a brush contact the walls of a channel may inhibit gouging and/or grooving the walls of the channel Separating the locations where different strands of a brush contact the walls of a channel may facilitate even cleaning of channel walls. For example, the distal end of the brush may be cut at an acute angle with respect to the axis of the brush. For example, the angle between the cut end and the axis may range preferably between 30 to 45 degrees and/or between 45 to 75 degrees and/or may range between 5 to 30 degrees and/or between 75 to 85.

An aspect of some embodiments of the current invention relates to cutting the distal end of an endodontic brush. For example, the end may be cut using an abrasive cutter (e.g., a grinding wheel) and/or a laser and/or an electrical discharge machining (EDM) cutter. Conventional wire brushes are cut using scissor type cutters. Such cutting techniques may leave uneven cuts on the different strands and/or may bend the end of the wire preventing proper opening of the brush. In some embodiments, a grinding wheel will rotate opposite the winding of the wire, for example to avoid unraveling the cable during cutting. Optionally, a rounded end may be formed on the wire, for example, by heating the end of the wire.

An aspect of some embodiments of the current invention relates to a coupling between an endodontic brush and a handpiece that is configured to be held to the handpiece more strongly against longitudinal slipping that against rotational slipping. For example, the coupling may be rotationally connected to the handpiece by friction and/or lock longitudinally into the handpiece by an interference element. For example, when the torque between the coupling and the handpiece becomes too high, the coupling may slip with respect to the handpiece (e.g., protecting the brush and/or tooth from high torque). Additionally and/or alternatively, the coupling may be locked longitudinally to the handpiece inhibiting it from being separated from the handpiece.

An aspect of some embodiments of the current invention relates to an endodontic brush and/or file having a helical outer coil that is uncoiled towards a distal end thereof. In some embodiments, a proximal portion of an endodontic brush may include an inner core (for example the core may include a cable including 1 to 5 and/or 5 to 10 and/or 10 to 20 strands, each strand of diameter for example between 0.02 to 0.15 mm for example the diameter of the core may range between 0.05-0.30 mm) and/or an outer coil wound helically around the core (for example the cord of the outer coil may be a wire and/or may have a diameter ranging between 0.1 to 0.4 mm). For example, the diameter of the brush/file in the proximal portion may be twice the diameter of the cord of the coil plus the diameter of the cable. Optionally, at the distal end, the core may be exposed (for example, the cable may open into a brush). For example, in the distal region the diameter of the brush/file may be the diameter of the core. In some embodiments, there may be a region of the brush/file (for example between the proximal portion of the brush/file and the exposed portion of the core) wherein the cord of the coil is uncoiled. For example, the distal end of the cord of the coil may be substantially straight and/or parallel to the core and/or oriented longitudinally. For example, where the cord and/or coil run substantially parallel to each other, the width of the brush/file may be equal to the diameter of the core plus the diameter of the cord of the coil. Optionally, the distal end of the cord may be stretched and/or tapered.

An aspect of some embodiment of the current invention relates to an endodontic tool including a brush on a distal end thereof and/or a file on a proximal portion thereof. In some embodiments, a proximal portion of an endodontic brush may include an inner core (for example the core may include a cable including 1 to 5 and/or 5 to 10 and/or 10 to 20 strands, each strand of diameter for example between 0.02 to 0.15 mm for example the diameter of the core may range between 0.05-0.30 mm) and/or an outer coil wound helically around the cable (for example the cord of the outer coil may be a wire and/or may have a diameter ranging between 0.1 to 0.4 mm). Optionally, the outer coil may include a rough surface. For example, the rough surface may be configured to file a proximal portion of an endodontic channel Optionally, the brush may include a distal portion where the core is exposed. For example, the distal portion may have a length of between 1 to 3 mm and/or between 3 to 9 mm and/or between 9 to 12 mm. Optionally, the distal end of the tool may be configured to open as a brush. Optionally, the file and/or brush may be configured to whip around when spun. For example, the proximal portion of the tool may be mounted eccentrically in a rotating handle and/or at an angle to an axis of rotation of the handle. Alternatively or additionally, the tool (file and/or brush) may be bent and/or undulate. Optionally, the brush and/or file is flexible. For example, centrifugal forces of spinning the tool may cause the file and/or brush to bend outward. The outward movement of the file/brush may bring it into contact with the sides of an endodontic channel and/or cause it to scrape and/or clean the sides of the channel An aspect of some embodiments of the current invention relates to an endodontic file with an active distal portion eccentrically positioned with respect to a handle attachment for a source of rotation. In some embodiments, the file is configured such that spinning the handle causing a whipping motion of the distal portion of the file. Optionally, the whipping motion causes the active portion of the file to clean surfaces inside a canal more completely and/or more evenly. In some embodiments, a file is packaged in a sterile packaging and/or supplied to a dental practitioner. Optionally, the active portion of the file is highly flexible. For example, the active portion may include one or more spiral wires wrapped around a central cable. In some embodiments the active portion of the file becomes more flexible moving distally along its length. Optionally, the file includes at the proximal end, a handle for a dental handpiece. Distal to the adapter there is optional transition region wherein the local eccentricity increases as on moves distally. Optionally, in an unstressed state, the active portion of the file distal to the transition region is all on one side of an axis of rotation of the handle. For example, in a resting state the center of mass of the active portion and/or of the active portion distal to the transition section may be displaced from the axis of rotation of the handle. For example, in a resting state the center of mass of the active portion and/or of the active portion distal to the transition section may be displaced further from the axis of rotation of the handle than the radius of the handle. For example, in a resting state the mean center of mass of the active portion and/or of the active portion distal to the transition section may be displaced further from the axis of rotation of the handle than the radius of the handle.

Various embodiments of the invention may include open ended (e.g., brushes) and/or closed ended (e.g., files) with straight, concentric, eccentric, bent and/or undulating shapes. The windings of a core may be twisted the same direction of an outer winding and/or in an opposite direction. The outer winding may be rough and/or smooth. The distal end of the instrument may be cut perpendicular to its axis and/or at an acute angle.

Specific Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1A illustrates an unevenly cut distal end of an endodontic brush in a closed configuration in accordance with an embodiment of the current invention. In some embodiments, an endodontic tool may be configured to clean both the apical and proximal parts of a canal. For example, the distal end of the tool may be formed as a brush. The brush may clean the apical portion of the canal. Optionally a middle and/or proximal section may include a winding 108. Optionally, a surface of the winding 108 may be roughened and/or the winding may be flexible. For example, the winding 108 may clean the sides of the middle and/or proximal parts of the canal. Optionally the tool may be straight. Alternatively or additionally, the tool may be eccentric and/or bent. In some embodiments, the winding 108 may be sharpened, for example, towards its distal end. Optionally the strands of the central core may be twisted in the same direction as the winding. Alternatively or additionally, the strands of the central core may be twisted in opposite directions as the winding.

Figure 1B:
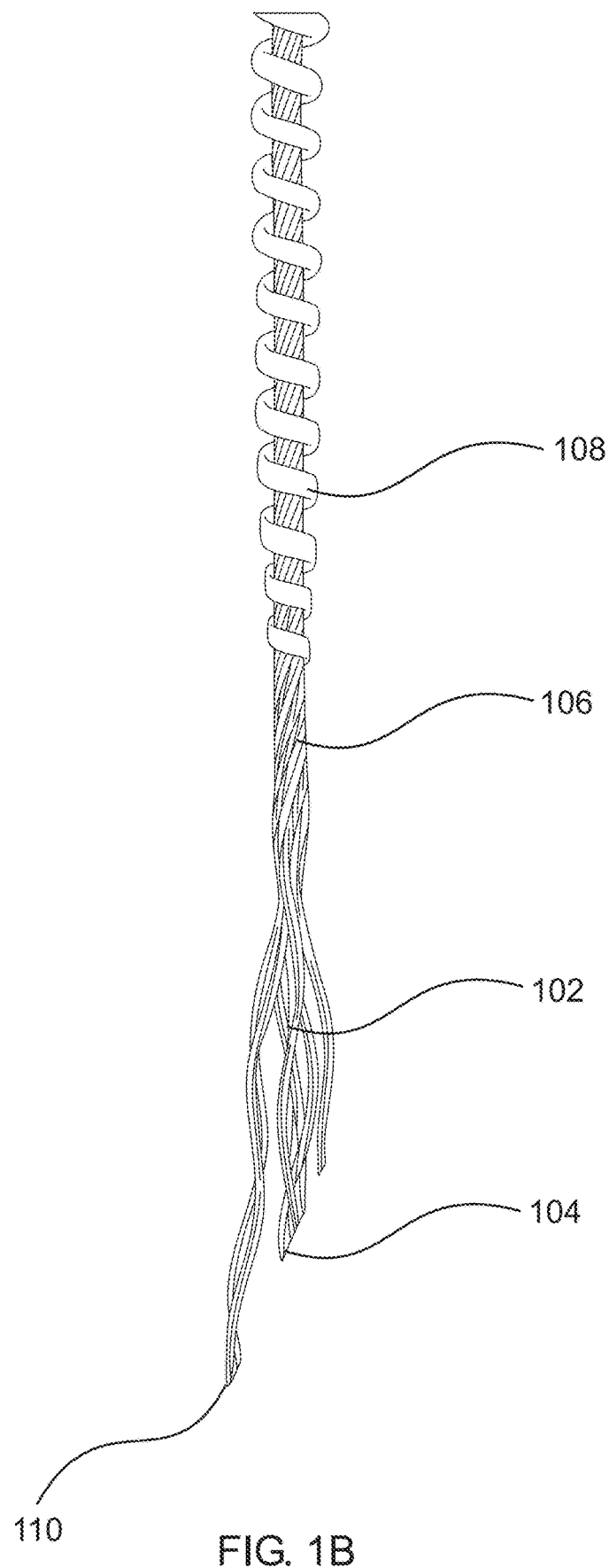
FIG. 1B illustrates an unevenly cut distal end of an endodontic brush in a partially open configuration in accordance with an embodiment of the current invention.

FIG. 1B illustrates an unevenly cut distal end of an endodontic brush in a partially open configuration in accordance with an embodiment of the current invention. In some embodiments, a distal end of a brush includes of an unbonded tip 102 of a cable. Optionally the distal end 104 of the brush is cut diagonally to the axis of the brush (e.g., to the axis of the coupling of the brush and/or a core 106 of the brush). In some embodiments, when the brush opens in a channel, the uneven cut of the strands of the cable increases the area contacted on the channel wall by the cables. In some embodiments, when the brush opens in a channel, the uneven cut of the strands of the cable decreases the chance of cutting a groove into the wall of the channel by the brush.

Figure 1C:
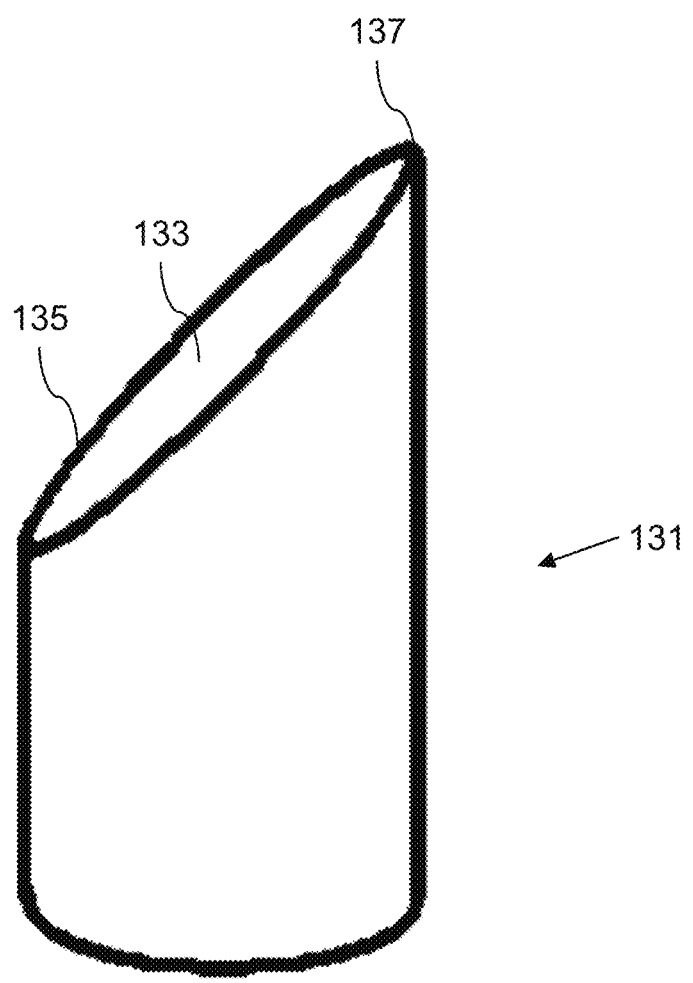
FIG. 1C illustrates a strand cut at an angle in accordance with an embodiment of the current invention.

FIG. 1C illustrates a strand cut at an angle in accordance with an embodiment of the current invention. cutting the strands of the core and/or winding on an angle may have a sharpening effect of the strand. For example, when a cylindrical strand 131 with a round cross section is cut at an angle, the cut face 133 with have an elliptical perimeter 135. The vertex 137 of the ellipse will be sharper than the perimeter of a circular surface resulting from a cut perpendicular to the axis of the cylinder.

Figure 7:
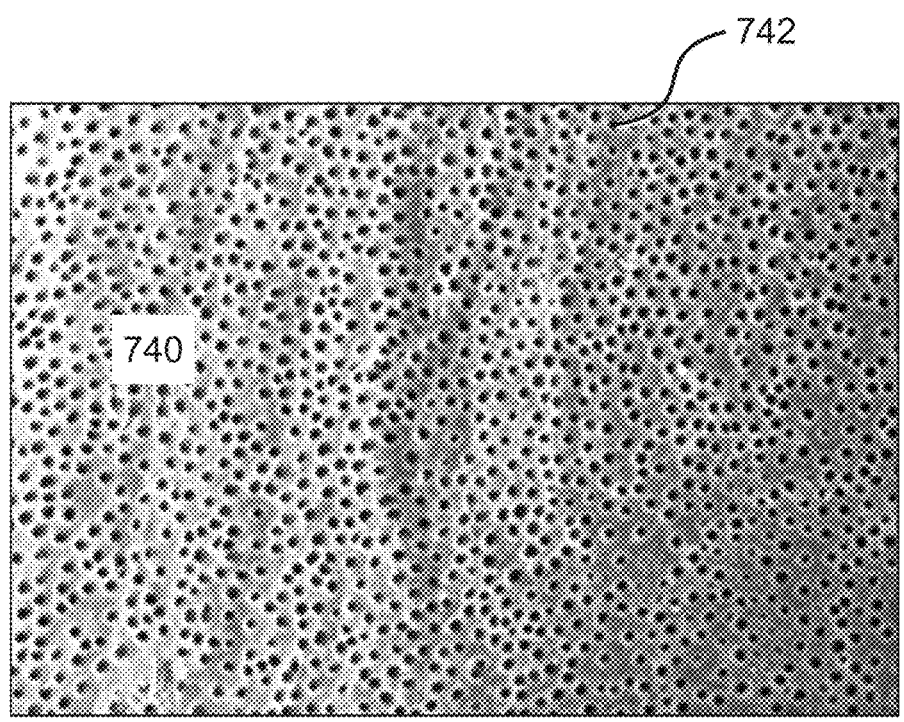
FIG. 7 illustrates at 500 times magnification a surface 740 of an apical portion of a channel in a tooth cleaned using an endodontic brush in accordance with an embodiment of the current invention.

In some embodiments, an endodontic brush is utilized with a rotary handpiece capable of rotating at speeds ranging for example between 4,000 to 40,000 rpm. Optionally (for example as illustrated in FIG. 7), the brush assembly comprises a coupler element for coupling to a handpiece and/or a central longitudinal core 106 anchored at a first end within the coupler element. Optionally, in use, the coupler is secured within the handpiece and, to this end, will be referred to throughout the following description and claims as the "handpiece end." In some embodiments, a helically winding (for example a helically wound wire 108) partially surrounds the core and is wound in a first direction (e.g., clockwise) so that when the brush is rotated in a clockwise direction, the helical wire tends to tighten. In some embodiments, the winding prevents the helical wire from opening upon insertion of the brush into the root canal, thus avoiding it snagging the internal wall thereof. The helical wire optionally extends toward a second end of the cord opposite the handle end, which protrudes beyond the helical wire 108 and will be referred to throughout the following description and claims as the distal end and/or "tip". The tip of the core 106 is optionally unbonded on its sides. for example, the protruding portion may protrude from the helical wire 2 to 9 mm and or may be unbonded at its distal 2-9 mm near the tip. In some embodiments the brush may be inserted into the canal without rotation and/or may be inserted into the canal while rotating in the unwinding direction.

The central cable (e.g., core 106) typically comprises a central single cord and/or a number of strands (for example 4-20) forming a flexible cable. Optionally, the cable is twisted and/or wound. In some embodiments, the core 106 may include an inner cable around which the strands are optionally wound. Optionally the inner cable may include filaments. For example, the filaments may be twisted in an opposite direction of the winding of the strands. Alternatively or additionally, the filaments may be twisted in the same direction of the winding of the strands. Optionally the strands and/or filaments of the core include stainless steel fibers and/or have a cross-section having a width in the order of 0.03-0.10 mm. The surrounding helically wound wire is optionally made of stainless-steel and/or has a cross sectional width of 0.2 to 0.4 mm. In one embodiment, the strands are wound in the opposite sense as a helical wire 108. Alternatively or additionally, the strands are wound in the same sense as a helical wire 108. Alternatively or additionally, the strands are not wound. The diameter of the core 106 typically ranges for example between 0.15-0.35 mm. Optionally, where the strands are wound around an inner cable, between 30 to 70% the diameter of the core 106 is the inner cable and/or between 30 to 70% of the diameters of the core 106 is the outer strands. Optionally, the distal end of the core is thin and reaches deep into the root canal, e.g., to an apical constriction and/or the last millimeter thereof In some embodiments, in operation, the coupler is attached to a dental handpiece and/or the distal end is inserted into the root canal of a tooth. Manual back and forth motion are optionally provided while the handpiece is set to rotate, for example, the rotational speed may range between 2000 to 6000 rpm and/or 6,000 to 30,000 rpm. A section of the helical wire 108 may be centrifugally thrown against the internal dentin layer of the canal wall following the natural curvature and/or complex cross-section of the root canal. An optional abrasive layer buffs and/or polishes the dentin layer. Optional back and forth motion enable introduction of lubricant and/or rinse of debris with a constant stream of water irrigation supplied by the handpiece.

In some embodiments, after the tip 104 of the core 106 reaches a desired location (e.g., an apical constriction of the channel), the assembly is rotated in the opposite direction and/or the brush is withdrawn from the root canal. Optionally, this has the effect of unwinding the twisted strands of the core thereby forming a brush as shown providing highly effective removal of debris.

In some embodiments, cutting the distal end of the tip unevenly increasing the contact area between the strands of the core 106 and the walls of the channel For example, as the brush opens up, the short strands contact the walls at a different location than the longer strands 110. This may facilitate, for example, contact with a larger area of the wall of the channel in comparison to strands cut evenly perpendicular to the axis of the brush. For example, this may lead to better cleaning when the rate of movement of the brush along the channel is slow and/or the brush remains longitudinally stationary with respect to the channel.

In some embodiments, cutting the brush unevenly (e.g., with different individual strands of the brush have different lengths) may reduce the likelihood of scoring a wall of a channel For example, when multiple strands all have the same size, multiple strands may score the same area of the wall. If the brush is not moved fast enough longitudinally along the canal, this multistrand scraping may score a groove in the walls of the channel Optionally is when the brush is cut unevenly and/or the strands are of different lengths, they will each scrape against a different area of the wall, reducing the probability that one portion of the wall will be scored repeatedly and/or more than other areas of the wall. For example, this may inhibit and/or the reduce the likelihood of creating a groove and/or deep scratch in the wall of the channel (for example, when the brush remains rotating without longitudinal movement, for example when the user did not work according to the protocol of backward and/or back and forth movements and/or paused in longitudinal motion).

In some embodiments, an even cut brush (where the distal ends of the strands are cut evenly perpendicular to the shank axis) may be used as a special tool, for example, in cases of a structure that needs to be remove (for example, a protrusion in the canal wall and/or a specific blockage where concentrated scoring may facilitate removal of the blockage).

In some embodiments, a disinfection and/or evacuation operation is carried out using the centrifugal force of the brush on a disinfectant fluid. For example, the centrifugal force may be created as a result high rate rotation of the brush (e.g., between 1000 to 1500 rpm and/or between 1500 to 8000 rpm and/or of 8000 to 20000 rpm and/or 20000 to 50000 rpm and/or 50000 to 150000 rpm). Optionally, rotation is in the opposite direction to the strand winding of the core and/or tip of the brush. For example, this may open the brush and/or exposed the fluid to the whirling strands of the brush. In very small channels, the brush may not have space to open fully. In such a case, the uneven cut of the brush distal end 104 may increase the turbulence and/or mixing effect (for example, because even in the closed configuration individual fibers are exposed differentially to the fluid).

In some embodiments, the brush is opened and/or activated only after injection of the disinfectant into the open canal and/or is only activated after insertion into the canal with the fluid. For example, this may inhibit causing damage and splashing of fluid outside the channel In some embodiments, uneven cutting of a distal end 104 of a brush may facilitate penetration of the brush into thin portions of a channel (for example an apical constriction). For example, when the brush is cut at an angle, the width of the distal end of the tip may be smaller than the full diameter of the core 106. For example, at its most distal point the brush may consist of one or a few longer final strands 110. These strands may enter very narrow constrictions, for example even narrower than the core 106 of the brush.

Figure 2:
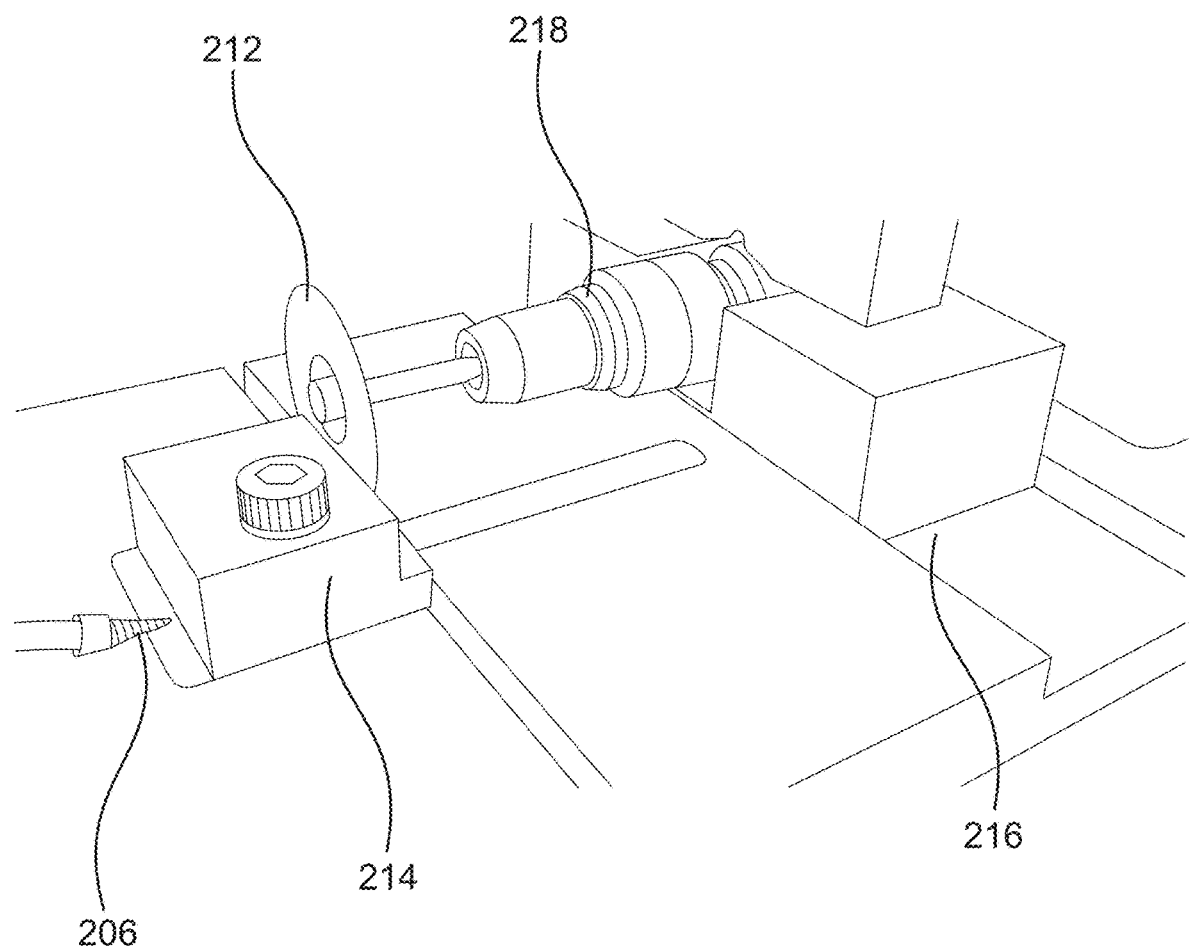
FIG. 2 illustrates cutting the distal end of an endodontic brush in accordance with an embodiment of the current invention.

FIG. 2 illustrates cutting the distal end of an endodontic brush in accordance with an embodiment of the current invention. In some embodiments, wires at the distal end of an endodontic brush 206 are cut using an abrasive cutter (e.g., rotating abrasive disk 212). The instant Applicant has observed that conventional snipping cutters (e.g., shearing cutters and/or wedging cutters [e.g., diagonal cutters]) and/or guillotine cutters sometimes do not cut cleanly. Such cutters (especially for such small strands of diameter between 0.02 to 0.15 mm) may cause crimping at the ends of cut strands and/or may cause strands to get stuck together. In some cases, cutting such strands with an abrasive cutter may reduce crimping and/or entangling of the strands as compared to snipping. Alternatively or additionally, strands may be cut using a laser cutter and/or an electrical discharge machining (EDM) cutter.

In some embodiments, a shaft and/or distal end of a brush 206 is held in a clamp 214. For example, the clamp 214 may include a groove into which the shaft of the endodontic brush 206 is placed and/or a tightening mechanism (for example a grooved block tightened against a smooth block). In some embodiments, a guide 216 is used to control cutting and/or movement. For example, a cutter may move along a guide 216 while the endodontic brush is held stationary and/or a cutter may move along a guide while the brush 206 is held stationary. Optionally, the endodontic brush may be held with its axis perpendicular to the cutter. Alternatively or additionally, the endodontic brush 206 may be held with its axis at an acute angle to the cutter. For example, holding the cutter at an acute angle to the cutter may result in the strands being cut unevenly (e.g., longer on one side than on the others). In some embodiments, the cutter is driven to spin by a motor 218. Optionally the direction of spin of the cutter is selected to retain the twisting of the wires of the core of the brush 105. For example, a diamond wheel may be operated at high rpm and against the direction of twisting of the cable fibers and/or in the winding direction of the strands.

FIGS. 3A and 3B illustrate and embodiment of an endodontic brushes cut with a shearing clipper. In some cases, a shearing clipper will leave protruding strands 320 and/or trapped strands 322. For example, trapped strands 322 may be crimped and/or crushed together. For example, this may inhibit opening of a brush.

Figure 3D:
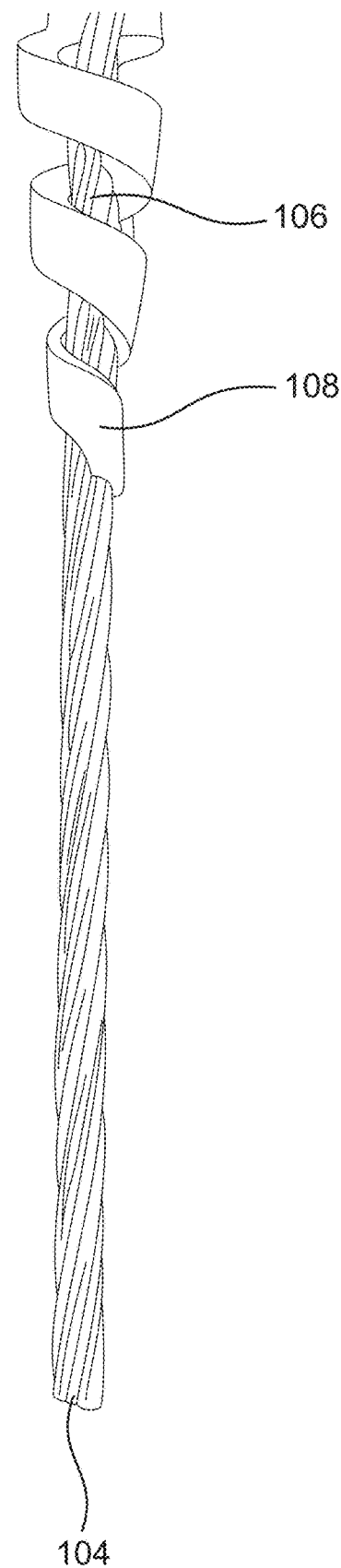

FIGS. 3C and 3D illustrate portions of endodontic brushes cut with an abrasive cutter rotating in a direction of winding of a core of the brush in accordance with an embodiment of the current invention. As can be seen in the figures, the abrasive cutter cases little damage to the core 106, cuts the distal end 104 of the strands cleanly without crimping and/or entangling.

Figure 4:
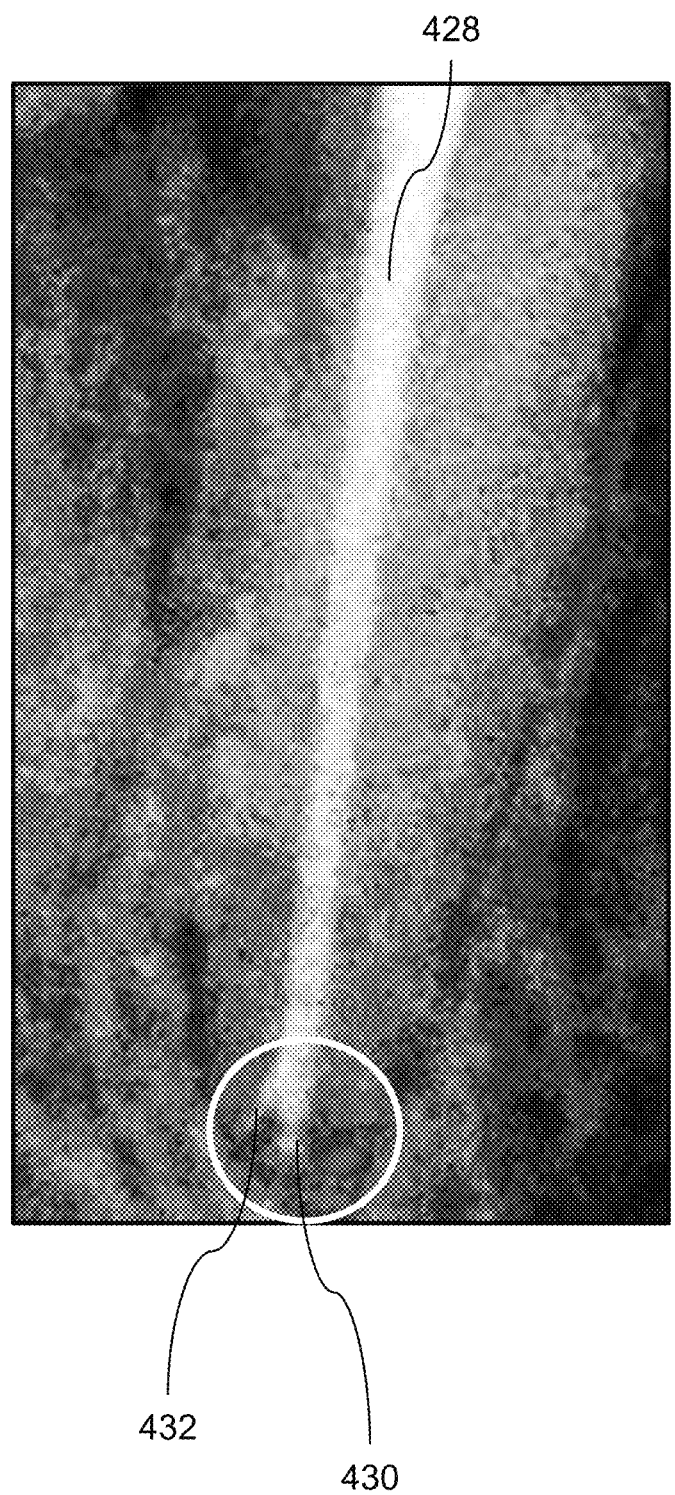
FIG. 4 is an image illustrating a channel cleaned using a brush in accordance with an embodiment of the current invention.

FIG. 4 is an image illustrating a channel cleaned using a brush in accordance with an embodiment of the current invention. In some embodiments, a cleaning solution and/or disinfection solution is injected into the channel For example, the solution may include sodium hypochlorite. Optionally, an external portion 428 of the channel is first cleaned with a file and then and apical portion 430 of the channel is cleaned with a brush. Alternatively or additionally, the channel 428 is cleaned in a single step. For example, a brush includes a rough outer surface of a proximal portion of that files the walls of an external portion 428 of a channel and a distal portion of that is inserted into and/or cleans an apical portion 430 of the channel Rotation of the brush may cause turbulence in the fluid. The turbulence (for example due to friction and/or momentum of the moving liquid) may clean areas of the channel (the fluid may clean the channel in addition to contact of the brush and/or in the absence of contact with the brush for example, in lateral canals 432 and/or areas where the brush does not reach). In some embodiments, biofilms and/or debris may be separated from the wall of the channel by contact with a file and/or a brush and/or by disinfectant and/or by turbulence.

Figure 5:
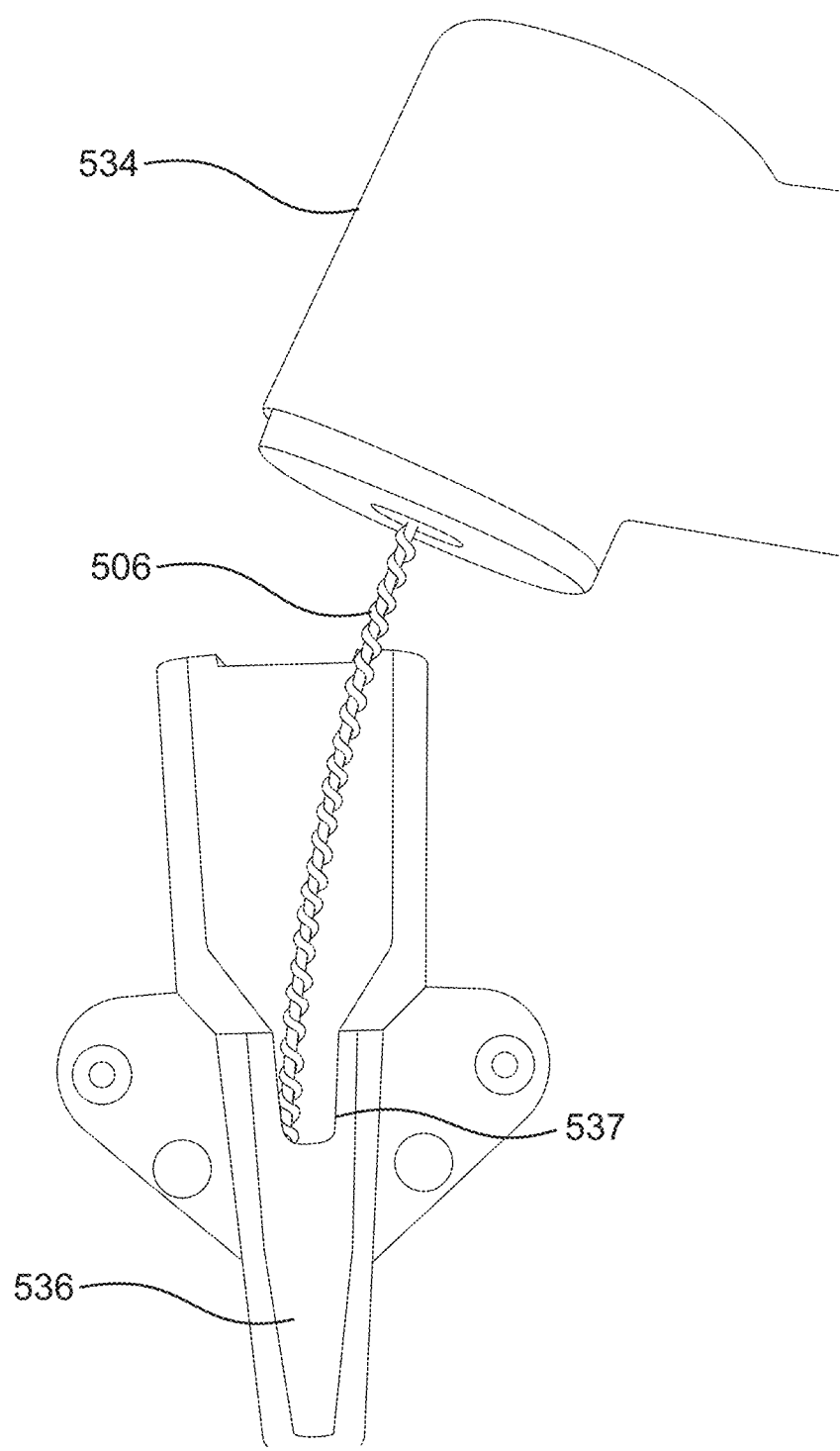
FIG. 5 is an image of an exemplary experiment illustrating effects of centrifugal forces.

FIG. 5 is an image of an exemplary experiment illustrating effects of centrifugal forces. In some embodiments, the high rpm and/or elasticity of the brush creates a phenomenon of centrifugal force. Optionally a dental handpiece 534 rotates an endodontic brush 506 in a channel Centrifugal forces optionally open the brush in an apical portion of the channel The open brush has a large cross section and/or high virtual mass and/or is efficient at imparting rotational energy to the fluid. For example, the fluid may be driven to rotate fast and/or at high turbulence (this can be seen, for example, in FIG. 5, e.g., by the turbidity 536 and white color of the fluid indicated the presence of vortexes and entrained bubbles) and/or by the deformation of the free surface 537. For example, at rotation rate of greater than 1500 rpm and/or especially at greater than 6000 rpm the strands may open (e.g., creating a large paddle like profile and/or large virtual mass) and/or cause high turbulence and/or high centrifugal forces in the fluid in the channel The centrifugal force and/or turbulence of the fluid may loosen blockages (such as air bubbles, biofilm remnants, canal mucous and/or debris) and/or for fluid into difficult to reach spaces (e.g., small apical channels, curved channels, dentinal tubuli and/or pores) that would not be reached by the brush alone and/or the fluid at lower rotation rates. Experiments have shown that this leads to improved disinfection of the channel and/or improved outcomes of the dental treatment (e.g., improved longevity of the implant). In FIG. 5 the high centrifugal force on the turbulent fluid causes the free surface 537 to slant with respect to the force of gravity and/or run up the walls of the channel For example, the brush is shown pushing against the left side of the channel which causes the free surface of the fluid to rise along the left wall. In the exemplary experiment, the high turbidity 536 of the fluid (e.g., its bright white color) is understood as an effect of high turbulence that may have caused cavitation. In some embodiments, the cavitation of the fluid may increase friction and/or abrasion on surfaces even when not reached by the bristles of the brush. For example, this may loosen blockages and/or facilitate disinfection.

Figures 6A, 6B, 6C, 6D:
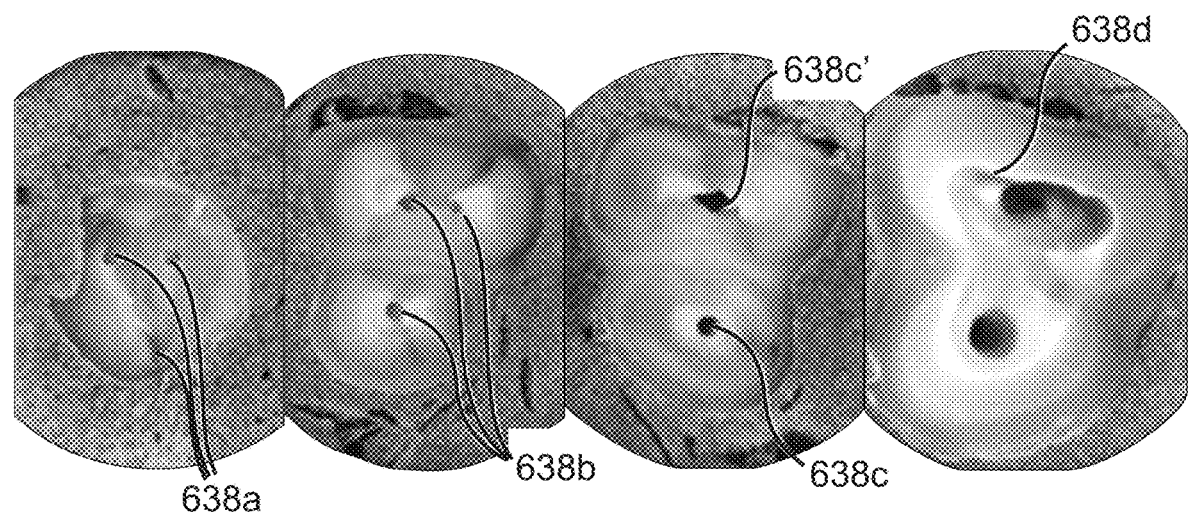
FIGS. 6A-6D illustrate cross sections of an exemplary channel cleaned in accordance with an embodiment of the current invention.

FIGS. 6A-6D illustrate cross sections of an exemplary channel cleaned in accordance with an embodiment of the current invention. The surfaces of the channel were significantly cleaner than similar channels cleaned with conventional endodontic techniques. For example, FIG. 6A illustrates a cross section of an apical portion 638*a* the channel at 2 mm from the apex wherein even small apical channels are seen to clean. For example, the thin distal section of the brush may enter the thin apical part of the channel 638*a* and/or open under centrifugal forces and/or clean the walls of the channel In FIGS. 6B and 6C exemplary cross sections of intermediate portions of the channel are illustrated at 4 mm and 6 mm respectively from the apex. There, in the exemplary embodiment, the cross section of the channel 638*b*, 638*c*, 638*c'* is thin and irregular (for example, at 638*c'* two apical channels of 638*b* appear to have converged to produce a larger irregular channel), nevertheless, the file and/or turbulence has cleaned the walls of the channel For example, in this portion 638*b*, 638*c*, 638*c'* whipping movement (e.g., due the bending file and/or its flexing under centrifugal forces) may cause roughened portions of the file (e.g., on an outer helically coiled wire) to contact and/or clean the walls of the channel In FIG. 6D an exemplary cross section of the opening of the channel is illustrated at 8 mm from the apex. There, in the exemplary embodiment, the cross section of the channel 638*d* irregular (for example, at 638*d* two intermediate channels of 638*c* and 638*c'* appear to have converged to produce a larger irregular channel), nevertheless, the file has cleaned the walls of the channel For example, in this portion 638*d* whipping movement and/or bending of the file and/or its flexing under centrifugal forces may cause roughened portions of the file (e.g., on an outer helically coiled wire) to contact and/or clean the walls of the channel FIG. 7 illustrates at 500 times magnification a surface 740 of an apical portion of a channel in a tooth cleaned using an endodontic brush in accordance with an embodiment of the current invention. Although the surface 740 is rough and has micro-pores 742, it appears clean. For example, the cleaning power of the brush may be a result of scraping by strands of the brush and/or turbulence.

Figure 8:
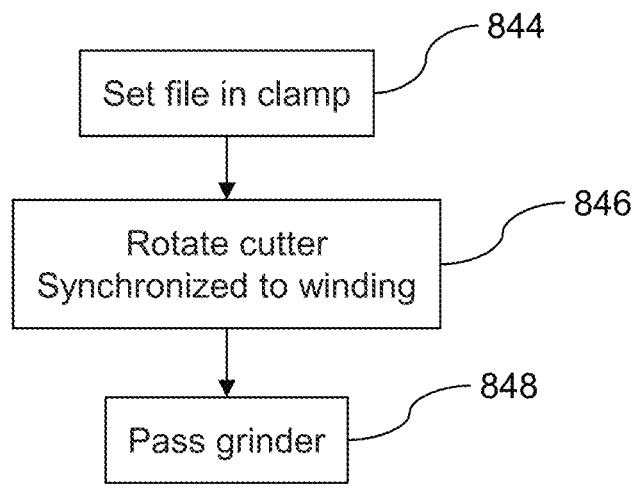
FIG. 8 is a flow chart illustration of a method of cutting a distal end of an endodontic brush in accordance with an embodiment of the current invention.

FIG. 8 is a flow chart illustration of a method of cutting a distal end of an endodontic brush in accordance with an embodiment of the current invention. For example, the shaft of the brush may be set 844 in a clamp. Optionally, the angle of the shaft with respect to the cutter is fixed (e.g., perpendicular and/or at a finite angle). Optionally an abrasive cutter is rotated 846 in a direction synchronized to the winding of the strands to be cut (for example in the same direction and/or opposite the winding). Optionally the cutter is then passed 848 across the strands thereby cutting the strands.

Figure 9:
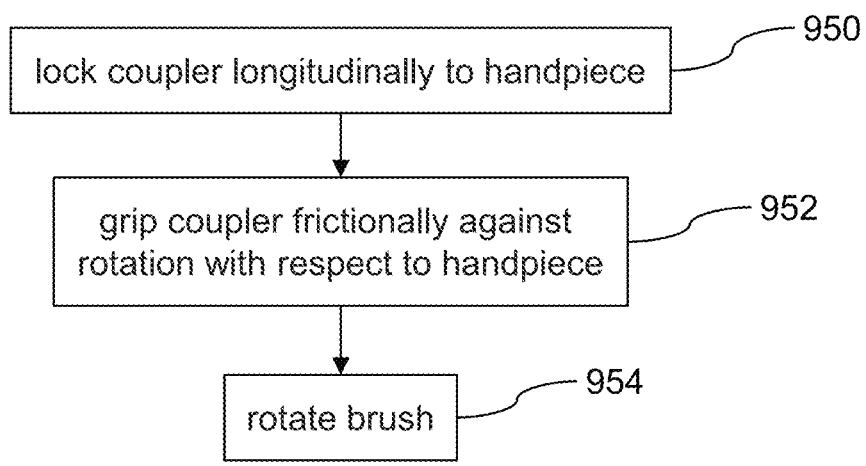
FIG. 9 is a flow chart illustration of cleaning an endodontic channel in accordance with an embodiment of the current invention.

FIG. 9 is a flow chart illustration of cleaning an endodontic channel in accordance with an embodiment of the current invention. For example, a coupler may be locked 950 to a dental handpiece, e.g., to inhibit longitudinal movement with respect to the handpiece and/or to inhibit disconnection between the handpiece and the brush. Optionally, the locking 950 between does not prevent rotational slippage between the coupler and the fitting (e.g., chuck) of the handpiece. For example, a locking element may be rotationally symmetric. For example, gripping 952 for rotational coupling between the handpiece and the coupler may be by friction. Optionally, the handpiece rotates 954 the brush as long as the torque does not pass a threshold. Past the threshold torque, the coupler optionally slips rotationally in the fitting of the handpiece without moving longitudinally with respect to the handpiece and/or disconnecting from the handpiece.

In some embodiments the invention provides a method for safely limiting the torque imparted to an endodontic tool (e.g., a brush and/or file) with a dental handpiece, while avoiding the disconnection between the tool and the dental handpiece. For example, inserting the coupler of the brush into the mounting barrel of a dental handpiece and locking the coupler longitudinally to the handpiece. Optionally, rotational movement is imparted to the brush based only on friction between the handpiece and the coupler. For example, the friction may be controlled by adjusting the diameter of the coupler and/or its material. For example, the coupler may include an elastic and/or flexible material (for example elastomer) and/or a high friction coefficient material (e.g., elastomer). Optionally, the imparted torque is limited by the squeezing force on the coupler (which may be slightly larger than the barrel of the handpiece) during insertion to the mounting barrel and by the coefficient of friction between the coupler and the barrel of the handpiece. Optionally, when the shear force between the brush and the endodontic channel increases beyond a predetermined value, the coupler will slip rotationally in the handpiece barrel. This may inhibit breakage of the tool and/or undesirable damage to the dentine layer. The longitudinal lock may inhibit undesirable release of the brush from the handpiece. For example, the outer diameter of the coupler may range between 100.5 to 102% the diameter of the barrel and/or between 102 to 105% the diameter of the barrel and/or between 105 to 115% the diameter of the barrel and/or between 115 to 150% the diameter of the barrel. For example, the outer diameter of the coupler may range between 2.3 to 2.36 mm and/or between 2.36 to 2.4 mm and/or between 2.4 to 2.5 mm. For example, the outer diameter of the coupler may range between 2.0 to 2.05 mm and/or between 2.05 to 2.15 mm and/or between 2.15 to 2.25 mm.

Figure 10:
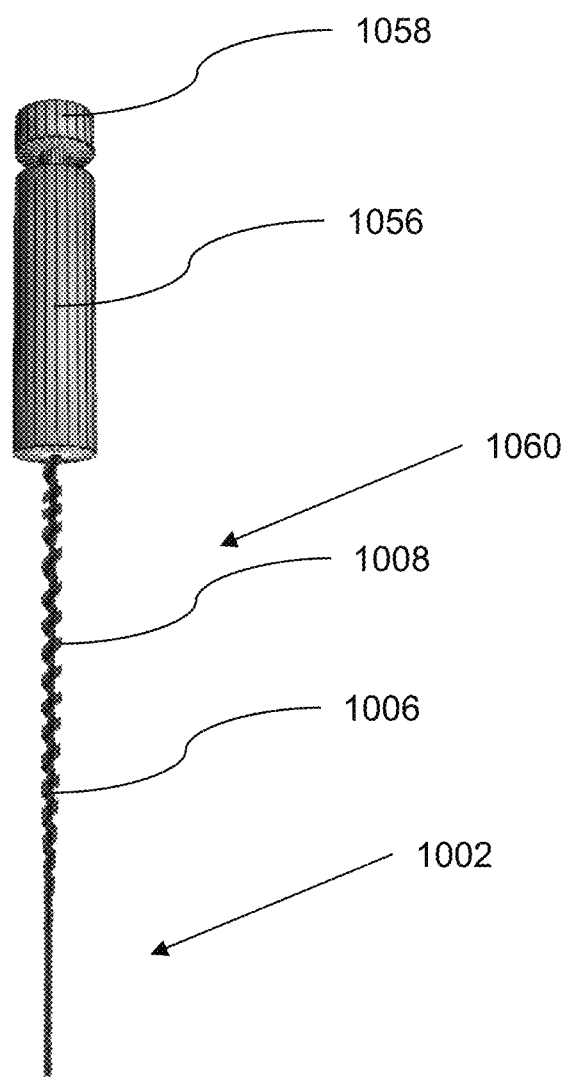
FIG. 10 illustrates an endodontic tool (e.g., a brush and/or a file) assembly in accordance with an embodiment of the current invention.

FIG. 10 illustrates an endodontic tool (e.g., a brush and/or a file) assembly in accordance with an embodiment of the current invention. For example, the assembly may include a coupler 1056 with a locking element 1058 that locks the tool to the handpiece against longitudinal forces and/or applies torque between the tool with a friction connection that allows slippage past a threshold torque. For example, the coupler 1056 may fit a standard D-ring fitting of a dental handpiece. Optionally the coupler 1056 may be rotational symmetrical thereby locking to the fitting but allowing rotational slippage. For example, the fitting and/or coupler 1056 may be configured to limit torque between the handpiece and the tool. For example, a friction fitting may allow slippage at torques of greater 0.05 N·cm. and/or greater than 0.01 N·cm and/or greater than 0.1 N·cm and/or greater than 0.5 N·cm and/or greater than 1 N·cm. Optionally the coupler 1056 may have a standard size for example diameter 2.35 mm, 3.0 mm and/or 3.175 mm. Alternatively or additionally the fitting may include a round spindle for connection to a standard chuck. Alternatively or additionally, other kinds and/or sizes of fittings are possible for example between 1 to 2.5 mm and/or between 2.5 to 3.5 mm and/or between 3.5 to 7 mm.

In some embodiments, an intermediate portion 1060 of the tool includes, for example, in the intermediate portion 1060, wherein a core 1006 (for example including a cable) bound by a helically wind wire 1008. Optionally, the tool may include an unbounded distal portion 1002 wherein the core 1006 is optionally unbounded and/or may open into a brush.

Figure 11:
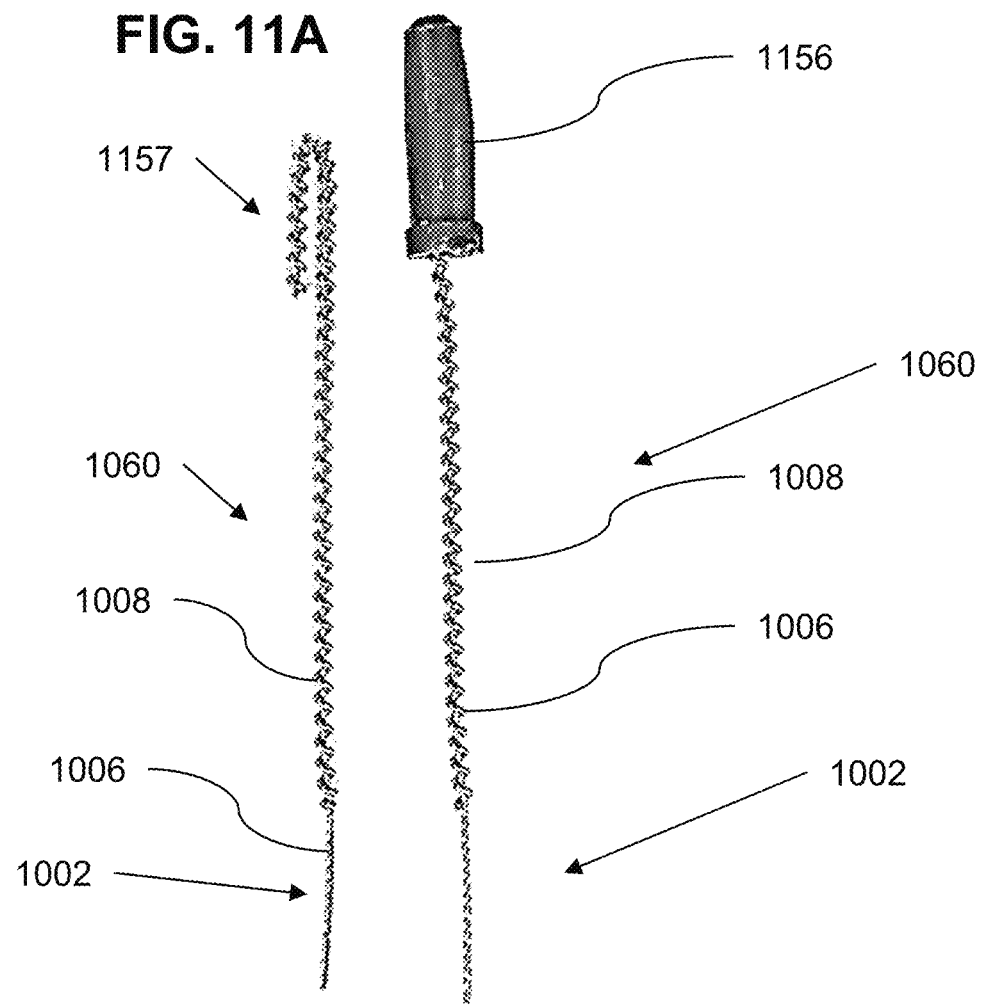
FIGS. 11A and 11B illustrate an endodontic tool in accordance with an embodiment of the current embodiment.

FIGS. 11A and 11B illustrate an endodontic tool in accordance with an embodiment of the current embodiment.

In FIG. 11A the tool is shown before mounting to a handle (e.g., coupler 1156). In some embodiments, the proximal 1157 of the tool is bent and/or double over inside the coupler 1156. For example, bending the distal end of the tool may make it easier to connect the tool to the coupler 1156. Additionally or alternatively, bending over the proximal portion of the tool may cause the tool to fit eccentrically to coupler 1156 and/or facilitate whipping motion of the tool. For example, the coupler may have the form of a tube with a hollow tube (e.g., the hollow may be open on one or two sides). Optionally, the coupler 1156 may be made of flexible and/or high friction material (e.g., rubber, elastomer and/or plastic). Optionally, the bent portion 1157 of tool is jammed into the hollow of the coupler.

Figure 12:
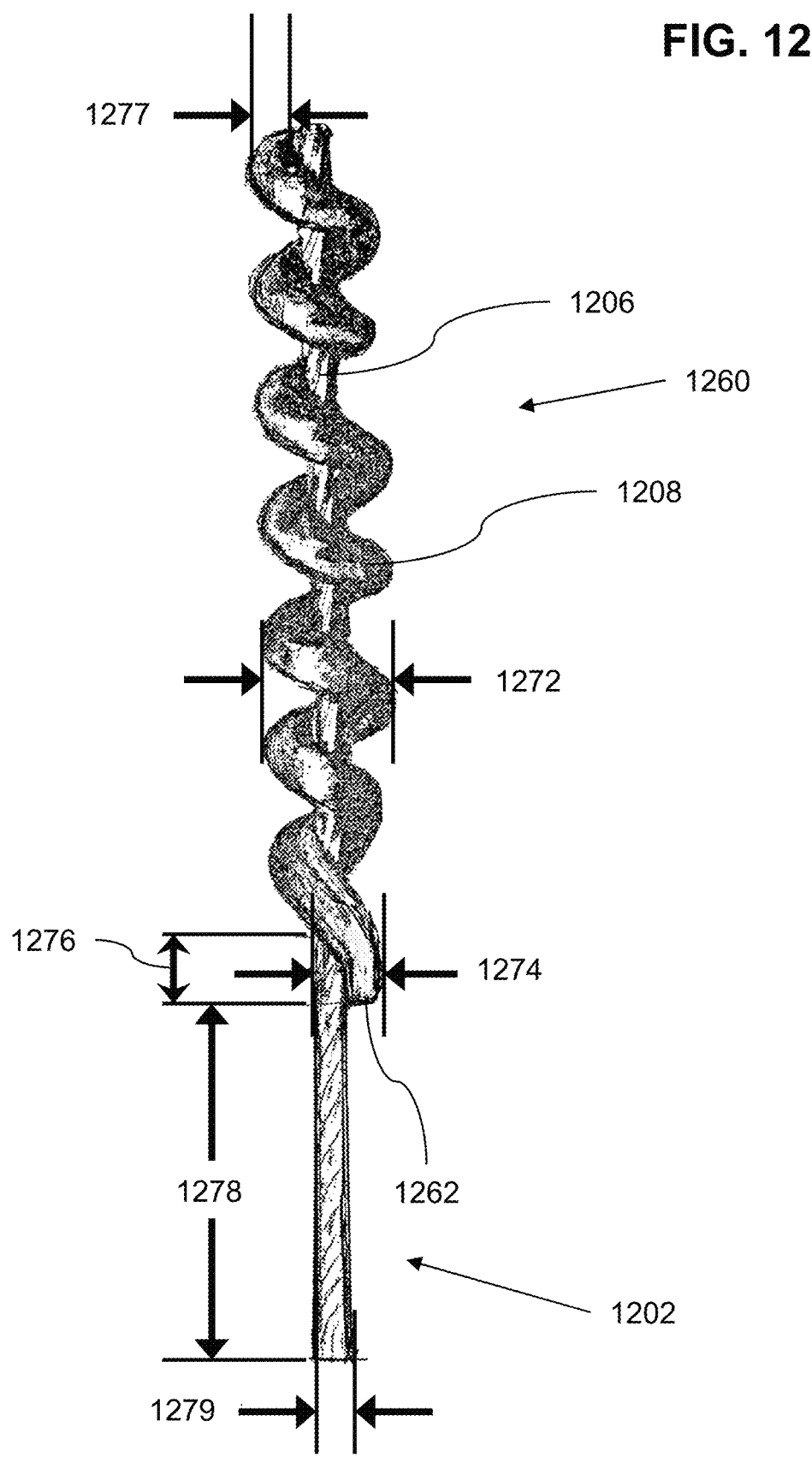
FIG. 12 is a schematic illustration of an endodontic brush in accordance with an embodiment of the current invention.

FIG. 12 is a schematic illustration of an endodontic brush in accordance with an embodiment of the current invention. In some embodiments, the brush includes an intermediate portion 1260 and/or a distal portion 1202. Optionally, the intermediate portion 1260 includes a core 1206 (for example including a multiple strands and/or a twisted cable) and/or a surrounding helical winding 1208. In the distal portion 1202, the core 1206 optionally protrudes and/or is unbound. Optionally, toward the distal portion 1202, the helical winding 1208 may be unwound. For example, a distal portion 1262 of the winding 1208 may be oriented parallel and/or substantially parallel to the core 1206 and/or axis of the tool. For example, in the distal portion 1202 the width (e.g., diameter) of the tool may be the thickness 1279 of the core. For example, in the intermediate portion 1260 the width (e.g., diameter) of the tool may be the thickness 1279 of the core plus twice the thickness 1277 of the helical winding 1208. Optionally, where the helical winding 1208 is unwound (for example, between the intermediate portion 1260 and the distal portion 1202 the width of the tool will between the width 1272 of the intermediate portion 1260 and the width of the distal portion 1202. For example, in the portion 1262 where the winding 1208 is parallel to the core, the width 1274 of the tool may be the width of the core 1206 plus the width 1277 of the winding 1208.

The instant Inventor has observed that in some cases, an endodontic file may damage a canal. For example, rotating an outer winding 1208 against the winding direction may sometimes cause a stiff wire of the outer winding to protrude and/or damage the canal. For example, the distal tip of the outer winding may project outward and scratch the walls of the channel In some embodiments, the distal tip of the outer winding may be blunt and/or may be directed in a direction that reduces the likelihood of damage. For example, the distal tip may be directed parallel to the core. This may reduce the likelihood of damage to the channel.

In some embodiments, a brush and/or file may include a single winding 1208 wound around a core 1206. For example, the core 1206 may include a cable of multiple strands. For example, the strands may be all twisted in a direction the same as the outer winding 1208. Alternatively or additionally, the strands may be all twisted in a direction the opposite the outer winding 1208. Alternatively or additionally, the core 1206 may include strands that are not twisted and/or strands that are twisted in different directions.

In some embodiments the width 1277 (e.g., diameter) of the winding 1208 may range between 0.15 to 0.25 mm and/or between 0.25 to 0.3 mm and/or between 0.3 to 0.4 mm and/or between 0.05 to 0.15 mm and/or 0.4 to 0.7 mm.

In some embodiments the width 1279 (e.g., diameter) of the core 1206 may range between 0.15 to 0.25 mm and/or between 0.25 to 0.3 mm and/or between 0.3 to 0.4 mm and/or between 0.05 to 0.15 mm and/or 0.4 to 0.7 mm.

In some embodiments the width 1272 (e.g., diameter) of the intermediate portion 1260 may range between 0.25 to 0.4 mm and/or between 0.4 to 0.7 mm and/or between 0.7 to 0.9 mm and/or between 0.9 to 1.2 mm.

In some embodiments the width 1274 (e.g., diameter) of the transition portion where in the winding 1208 unwinds between the intermediate portion 1260 and the distal portion 1202 may range between 0.1 to 0.25 mm and/or between 0.25 to 0.7 mm and/or between 0.7 to 1.0 mm. Optionally, the length 1276 of the transition portion may range between 0.1 mm to 0.4 mm and/or between 0.4 mm to 0.8 mm and/or between 0.8 mm to 1.6 mm and/or between 1.6 mm to 3.2 mm. Optionally, the winding 1208 is the same in the fully wound portion (e.g., the intermediate portion 1260) and the transition portion.

In some embodiments, the length 1278 of the distal section 1202 may range between 0.1 mm to 0.4 mm and/or between 0.4 mm to 0.8 mm and/or between 0.8 mm to 1.6 mm and/or between 1.6 mm to 3.2 mm and/or between 3.2 to 7 mm and/or between 7 to 10 mm and/or between 10 to 20 mm.

Figure 13:
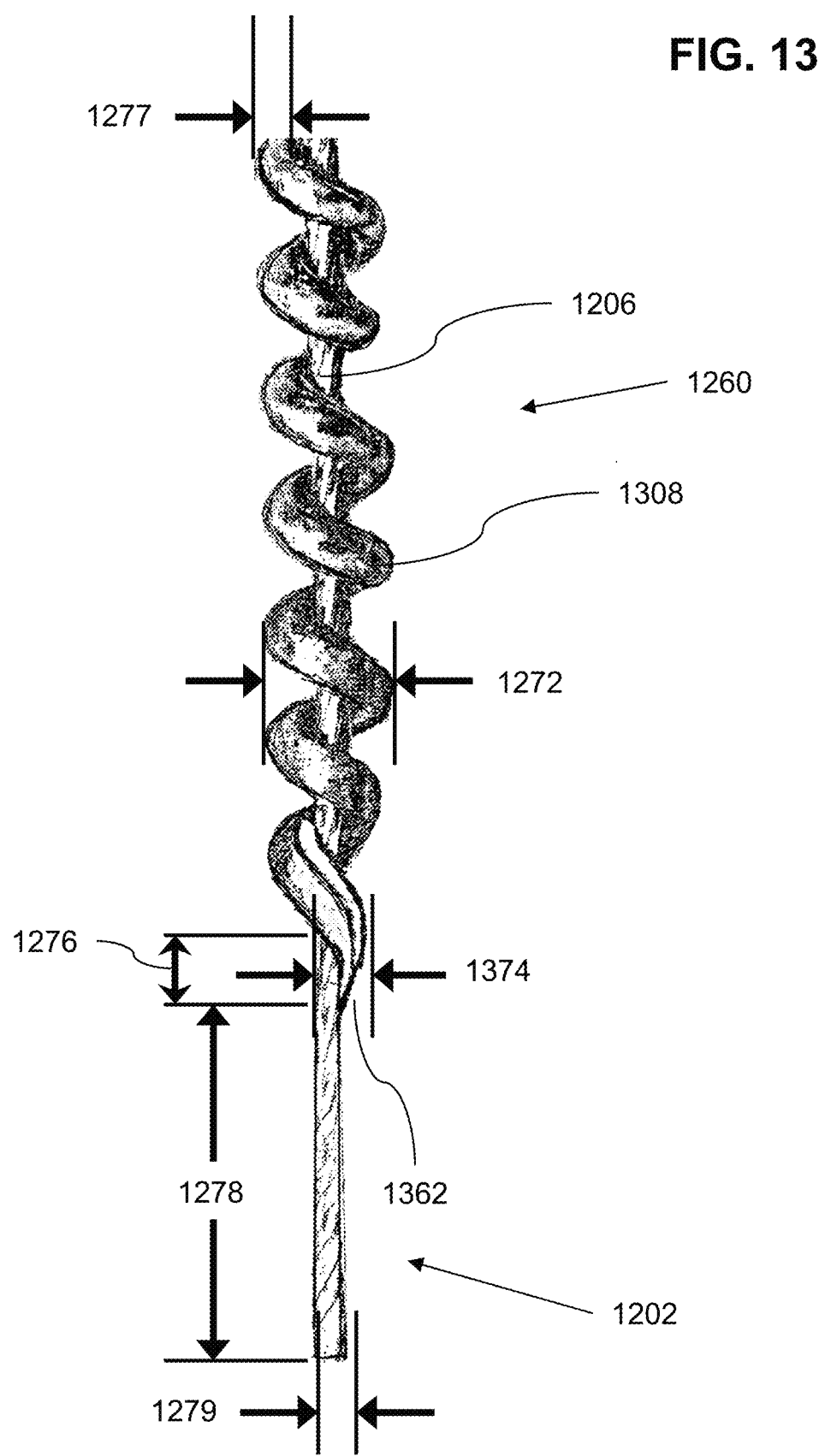
FIG. 13 is a schematic illustration of an endodontic brush with a stretched end in accordance with an embodiment of the current invention.

In some embodiments, the intermediate portion 1260 and/or the distal portion 1202 may be bent and/or flexible and/or undulate. Optionally an outer portion of the tool (for example the helical winding 1208) may be rough (for example, it may be treated for roughening for example by Ti plasma spray (TPS), double acid etching (DAE), sandblasting with large grit and acid etching (SLA), anodization (ANO), machining (MAC), silicacoating (Sc), sandblasting (Sb), metal primers, coupling agents, fiber (Fb) application, and opaquers (O)). In some embodiments, a material may be used in the roughening, for example including silanes, metal primers, or adhesives (Visiobond [V], Porcelain Photobond [PP], Alloy Primer [AP], Unibond sealer [Us], ESPE-Sil [ES]), and/or opaquers, for example, Clearfil St Opaquer (CstO), Sinfony (S), Miris (M), and/or EO-Cavex). FIG. 13 is a schematic illustration of an endodontic brush with a stretched end in accordance with an embodiment of the current invention. Optionally, the width 1277 of the winding 1308 is the same in the fully wound portion (e.g., the intermediate portion 1260) is greater than the width of the winding 1308 in the transition portion. For example, the winding may be malleable (for example metal wire) that is stretched and/or narrowed in the transition section 1362 and/or where it is unwound and/or near its distal end. For example, the width 1374 of the transition section 1362 may be less than the sum of the width 1279 of the core 1206 and the width of the winding 1308 of the intermediate portion 1260.

In some embodiments, the winding 1308 may be configured to inhibit unwinding. For example, when the brush is rotating in an unwinding direction of the helical winding 1308, the winding 1308 may resist unwinding. Optionally, a distal portion and/or the distal end of the winding 1308 may be thick enough to resist unwinding. In some embodiments, stretching the winding 1308 and/or directing the tip of the winding 1308 in a chosen direction different from a proximal portion of the winding 1308 (e.g., unwinding the distal portion and/or directing the distal tip parallel to the core 1206) may facilitate narrowing a distal portion of the file (e.g., a distal portion of the winding 1308) with reduced danger of damaging the channel.

In some embodiments, a brush and/or file may include a single winding 1308 wound around a core 1206. For example, the core 1206 may include a cable of multiple strands. For example, the strands may be all twisted in a direction the same as the outer winding 1308. Alternatively or additionally, the strands may be all twisted in a direction the opposite the outer winding 1308. Alternatively or additionally, the core 1206 may include strands that are not twisted and/or strands that are twisted in different directions.

Figure 14:
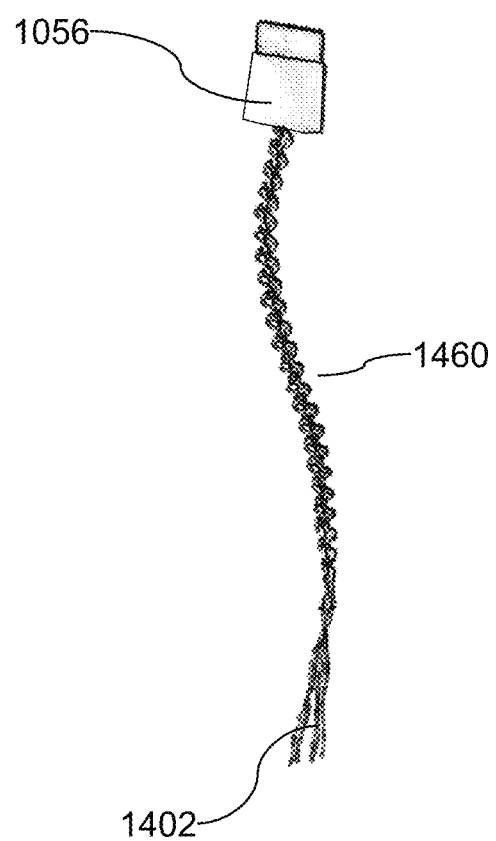
FIG. 14 is a schematic illustration of an eccentric endodontic brush in accordance with an embodiment of the current invention.

FIG. 14 is a schematic illustration of an eccentric endodontic brush in accordance with an embodiment of the current invention. In some embodiments, the distal portion 1402 of a tool includes a brush, for example for cleaning an apical portion of a channel Optionally an intermediate portion 1460 may be roughened and/or bent and/or flexible. For example, the roughened parts of the intermediate portion 1460 may be configured to scrape the sides of a channel For example, the intermediate portion 1460 and/or distal portion 1402 may include a bend and/or an eccentricity. For example, the bend and/or the eccentricity and/or the flexibility may cause the file and/or the brush to whip around inside a channel.

Figure 15:
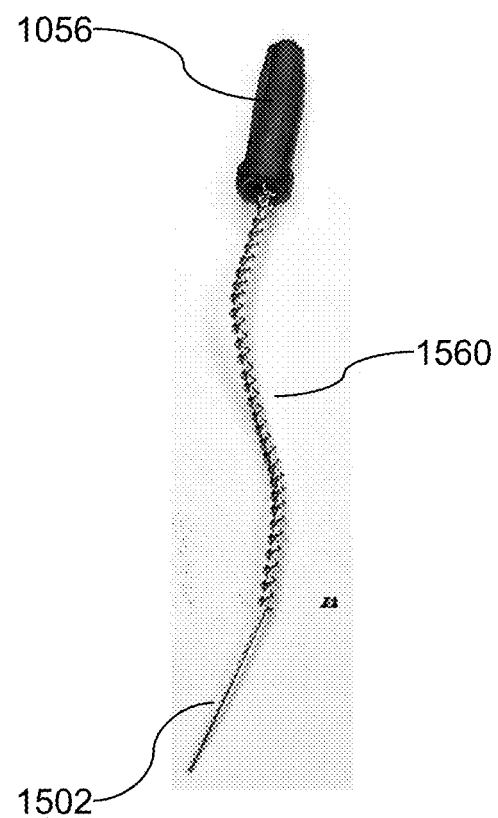
FIG. 15 is a schematic illustration of an eccentric endodontic brush in accordance with an embodiment of the current invention.
Figure 16:
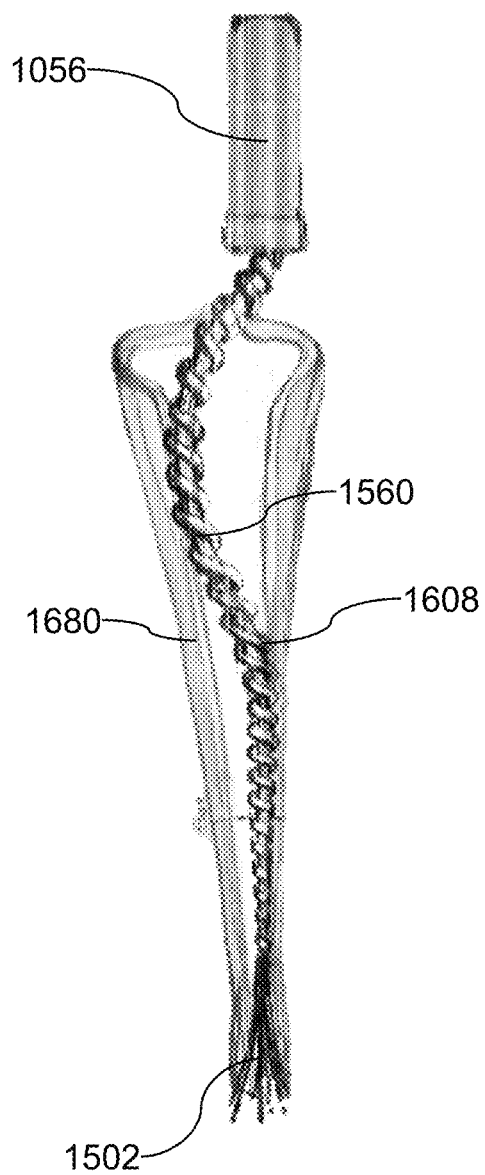
FIG. 16 illustrates an endodontic brush in a simulated channel in accordance with an embodiment of the current invention.

FIG. 15 is a schematic illustration of an eccentric endodontic brush in accordance with an embodiment of the current invention. In some embodiments, the distal portion 1502 of a tool includes a brush, for example for cleaning an apical portion of a channel Optionally an intermediate portion 1560 may be roughened and/or bent and/or flexible. For example, the roughened parts of the intermediate portion 1560 may be configured to scrape the sides of a channel For example, the intermediate portion 1560 and/or distal portion 1502 may include a multiple bends and/or may undulate and/or an eccentricity. For example, the bends and/or the eccentricity and/or the flexibility may cause the file and/or the brush to whip around inside a channel FIG. 16 illustrates an endodontic brush in a simulated channel in accordance with an embodiment of the current invention. In some embodiments, a bent endodontic brush is rotated inside a channel 1680. Optionally the brush includes a rough edge. For example, the intermediate portion 1560 of the brush may be surrounded by a helical wire 1608. The helical wire 1608 is optionally roughened. Optionally, the brush is bent and/or flexible and/or eccentric to the rotation such that various parts of the sides of brush rub against the walls of the channel 1680, cleaning the channel In the narrow apex of the channel, the narrow core that is optionally exposed at a distal portion 1502 of the brush may enter and/or expand to clean the walls of the channel 1680 and/or to create movement in a fluid, cleaning the channel.

Figure 17:
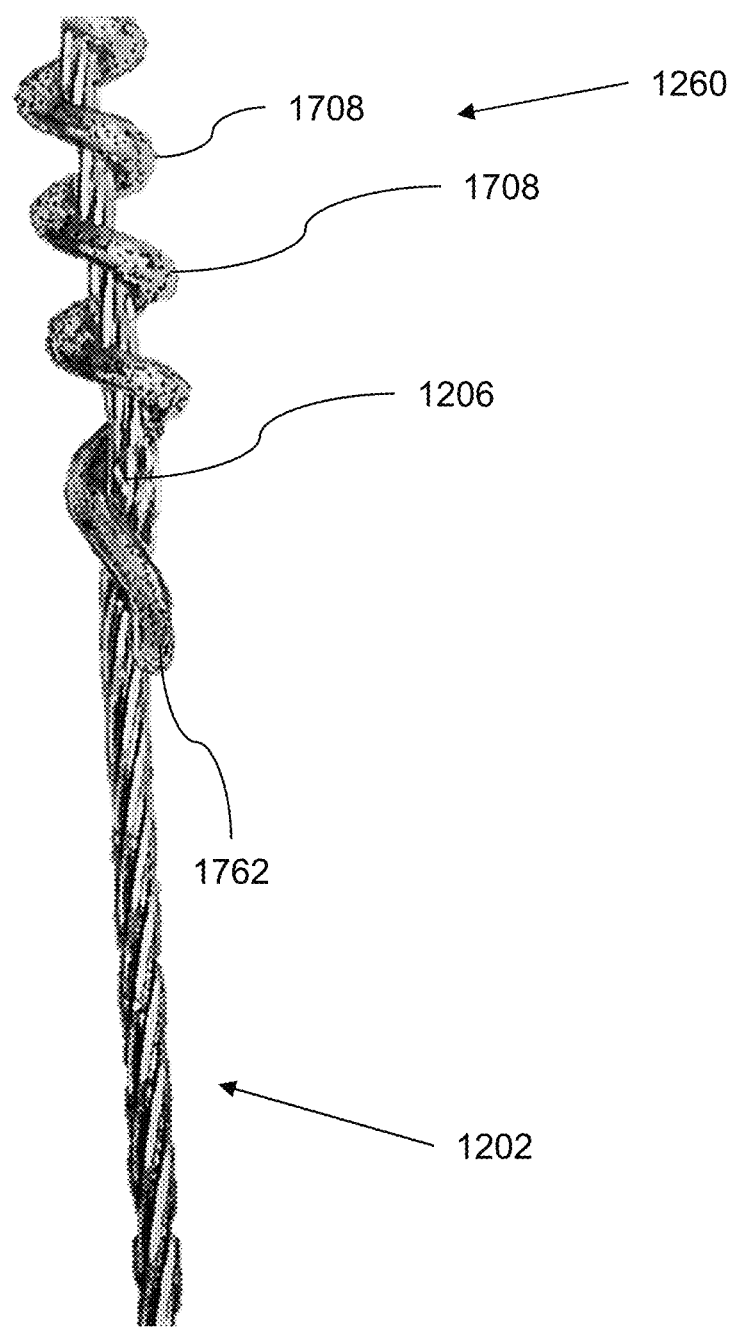
FIG. 17 illustrates an endodontic brush with a roughened edge in accordance with an embodiment of the current invention.

FIG. 17 illustrates an endodontic brush with a roughened edge in accordance with an embodiment of the current invention. For example, the outer edge may include the surface of an external winding 1708 of the brush. For example, it may be treated for roughening for example by Ti plasma spray (TPS), double acid etching (DAE), sandblasting with large grit and acid etching (SLA), anodization (ANO), machining (MAC), silicacoating (Sc), sandblasting (Sb), metal primers, coupling agents, fiber (Fb) application, and opaquers (O). In some embodiments, a material may be used in the roughening, for example including silanes, metal primers, or adhesives (Visiobond [V], Porcelain Photobond [PP], Alloy Primer [AP], Unibond sealer [Us], ESPE-Sil [ES]), and/or opaquers, for example, Clearfil St Opaquer (CstO), Sinfony (S), Miris (M), and/or EO-Cavex). Optionally the brush may be bent and/or eccentric. Optionally, the distal end of the brush may be cut unevenly and/or cut using an abrasive cutter. Optionally, a distal portion 1762 of the helical winding may be unwound and/or parallel to the core 1206. Optionally, a distal portion of the helical winding may be sharpened and/or stretched and/or left with the same with as in an intermediate portion thereof. Various dimensions of the brush of FIG. 17 may be the same as described in any other embodiments disclosed herein.

Figure 18:
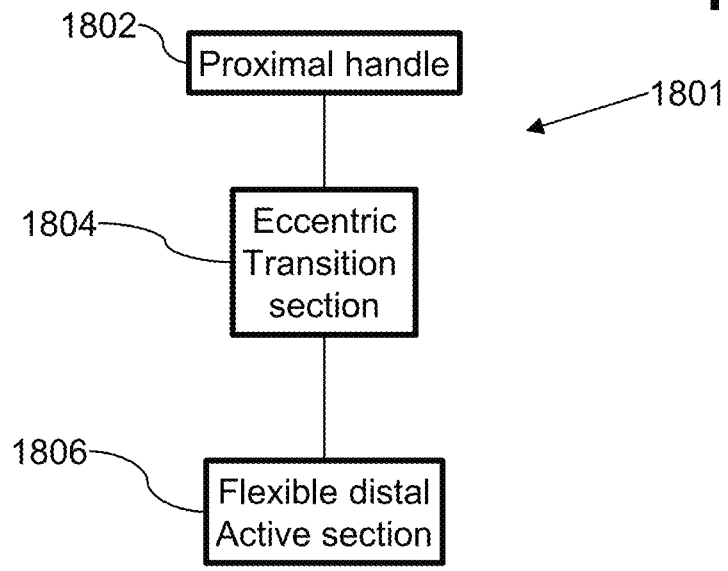
FIG. 18 is a block diagram of an eccentric endodontic file in accordance with an embodiment of the current invention.

FIG. 18 is a block diagram of an eccentric endodontic file 1801 in accordance with an embodiment of the current invention. In some embodiments, a file 1801 includes a proximal handle 1802 and a distal active section 1806. Optionally, the proximal handle 1802 is configured for rotation around an axis of rotation (for example, the handle may include a fitting configured to fit a dental handpiece and/or for rotation by the dental hand piece around the axis of rotation, for example, the axis of rotation may be an axis of symmetry of all or part of the handle). Optionally, the distal active section 1806 of the file 1801 is mounted to the handle eccentrically and/or asymmetrically. For example, the local center of mass of the distal active section 1806 may be displaced from the center of rotation of the handle. For example, the local center of mass of the distal active section 1806 may never coincide with the axis of rotation of the handle and/or may all be on one side of the axis of rotation of the handle. For example, the mean center of mass of the distal active section 1806 may be displaced away from the axis of rotation of the handle by a distance between the radius of the handle to twice the radius of the handle and/or by more than twice the radius of the handle and/or by between half the radius to the radius of the handle. In some embodiments, the flexible active section 1806 distal to the transition section 1804 is substantially parallel to the axis of rotation of the handle 1802 in an unstressed state. For example, the distance between axis of rotation and the local center of mass of the flexible active section 1806 distal to the transition section 1804 may be approximately fixed along the length of the flexible active section 1806, e.g., from the transition section 1804 to the distal tip of the file 1801 and/or to about the distal tip.

In some embodiments file 1801 may include a transition section 1804. For example, the along the transition section the distance of the local center of gravity of the file from the axis of rotation of the handle may increase. Optionally, the transition region 1804 is less flexible than the distal active region 1806. Optionally, the transition region 1804 is more flexible than the proximal handle 1802. In some embodiments, the transitional section 1804 is part of the active region of the file 1801 (for example, the active region may be made of flexible wire and/or include a rough coating for cleaning a canal). Alternatively or additionally, the transitional section is part of the handle (for example, the handle may be made of plastic and/or stiff metal).

In some embodiments, the handle 1802 may include a friction fitting and/or a locking fitting. For example, a locking fitting may include a D-ring. Optionally, the material of the handle may include plastic and/or metal. In some embodiments, the handle may include a torque limiter. For example, a friction fitting may slip between the handpiece and/or the file at high torque (e.g., for torque greater than 30 g/(cm N) and/or greater than 100 g/(cm N) and/or greater than 5 g/(cm N)). Alternatively or additionally, the handle may include a locking fitting that transmits apply high torque between a dental handpiece and the file.

Figure 19:
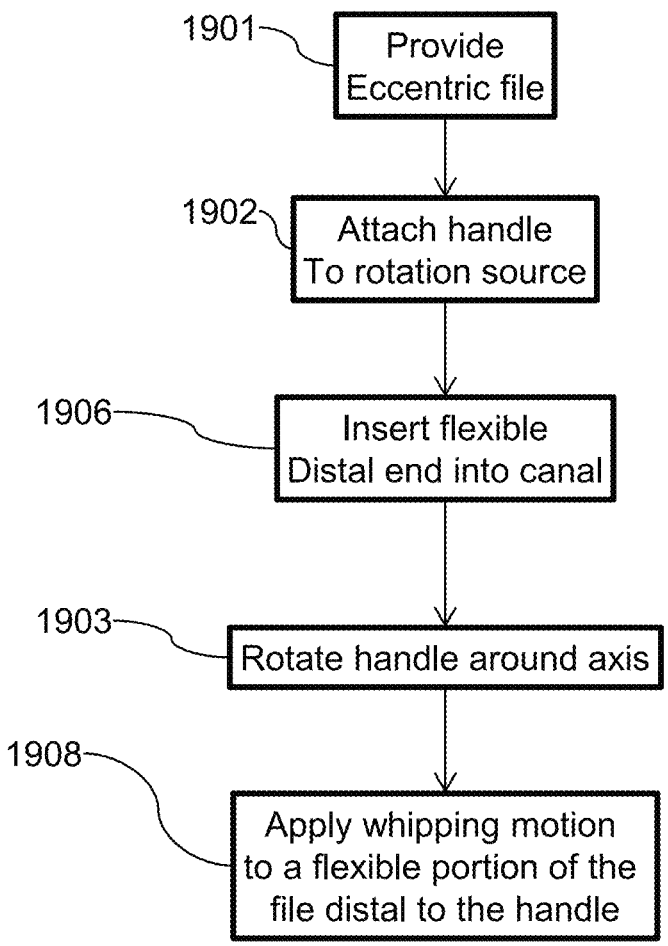
FIG. 19 is a flow chart illustration of a cleaning an endodontic canal in accordance with an embodiment of the current invention.

FIG. 19 is a flow chart illustration of cleaning an endodontic canal in accordance with an embodiment of the current invention. In some embodiments, an eccentric endodontic file may be supplied 1901 (for example, the file may include any of the embodiments described herein). Optionally, a proximal handle of the file is attached 1902 to a rotation source (for example a dental handpiece). In some embodiments, a flexible distal portion of the file is inserted 1906 into a canal that needs cleaning. Optionally, the handle is rotated 1903 (for example by the dental handpiece) around an axis of rotation thereof. For example, rotation 1903 of the file may be initiated after insertion 1906 of the distal tip into the canal. Rotation 1903 of the handle optionally causes a rotating whipping 1908 motion of a flexible portion of the file distal to the handle. For example, the whipping 1908 motion may occur to a transition portion of the file and/or a part of a flexible distal section. Optionally, the whipping 1908 motion may occur to a part of the file that is inside the canal. Alternatively or additionally, a part of a flexible distal section of the file (for example an intermediary part of the flexible distal section and/or a distal tip thereof) may whip 1908 inside the canal. Optionally, whipping motion may cause an active flexible portion of the file that is inside the canal to clean the canal and/or contact the walls of the canal over a larger area than simple rotational motion. For example, the whipping flexible portion may whip around throughout a region much larger than the portion of the file itself.

In some embodiments, the file will include a brush, for example, on a distal end thereof. Optionally the rotation of the file 1903 will open the brush. For example, the brush may be inserted 1906 into a distal (e.g., apical) portion of the canal and/or rotated 1903 and/or opened. Optionally, the brush may clean the apical part of the canal. For example, cleaning may include scraping the walls, turbulence and/or chemical activation. Optionally, the brush may be inserted 1906 while not rotating 1903 and/or while rotating in a winding direction and/or while rotating 1903 in an unwinding direction.

Figure 20:
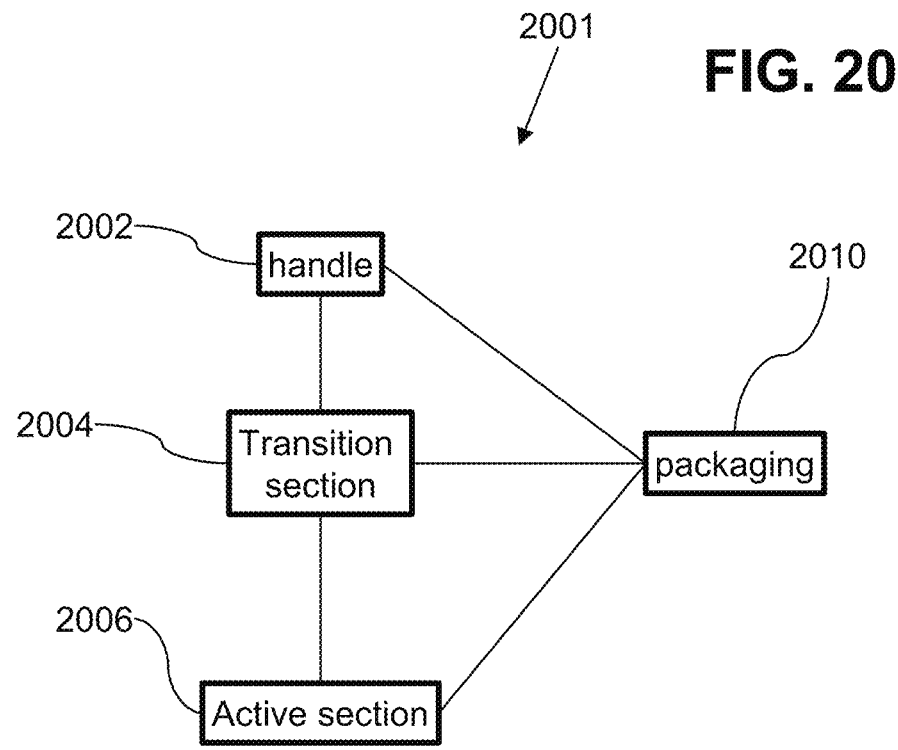
FIG. 20 is a block diagram of kit including an eccentric endodontic file in accordance with an embodiment of the current invention.

FIG. 20 is a block diagram of kit 2001 including an eccentric endodontic file accordance with an embodiment of the current invention. Optionally, a file may include an eccentric endodontic file, for example as described in any of the embodiments described herein. For example, the file may include a handle 2002 and/or a transition section 2004 (optionally distal to the handle) and/or an active section 2006 (optionally distal to the transitional section). Optionally the eccentric file is supplied and/or packaged in a non-stressed state. Optionally, the center of gravity of the active section 2006 is not on the axis of rotation of the handle 2002. Optionally the file is packaged for distribution (for example sale) in a package 2010 (for example, a box and/or a tray and/or a bottle and/or an envelope). Alternatively or additionally, the file is packed for sterility. For example, the file may be packed in a sterile package 2010. For example, sterile packaging may include a microbial barrier (e.g., in accordance with standards such as The Association of Surgical Technologies standards, Advancement of Medical Instrumentation ANSI/AAMI standards) such as a woven material, a rigid container, a paper-plastic peel pack. For example, the sterile packaging may withstand heat sterilization and/or allow gas penetration for EtO and/or gas and/or plasma sterilization. Optionally, the package 2010 may include a tray. In some embodiments, a kit may include a file and/or sterilization materials and/or packaging. For example, packaging may include glass, paper, plastic and/or metal containers. For example, packaging may include fibrous materials, films, foils and/or laminates. In some embodiments a package may be closed and/or sealed. For example, a seal may include a gasket and/or a filter and/or adhesive and/or a heat seal.

Figure 21:
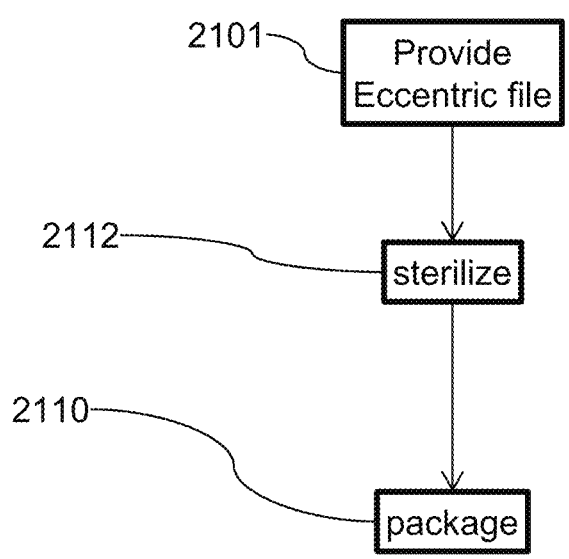
FIG. 21 is a flow chart illustration of preparing a kit including an eccentric endodontic file in accordance with an embodiment of the current invention.
Figures 22, 23:
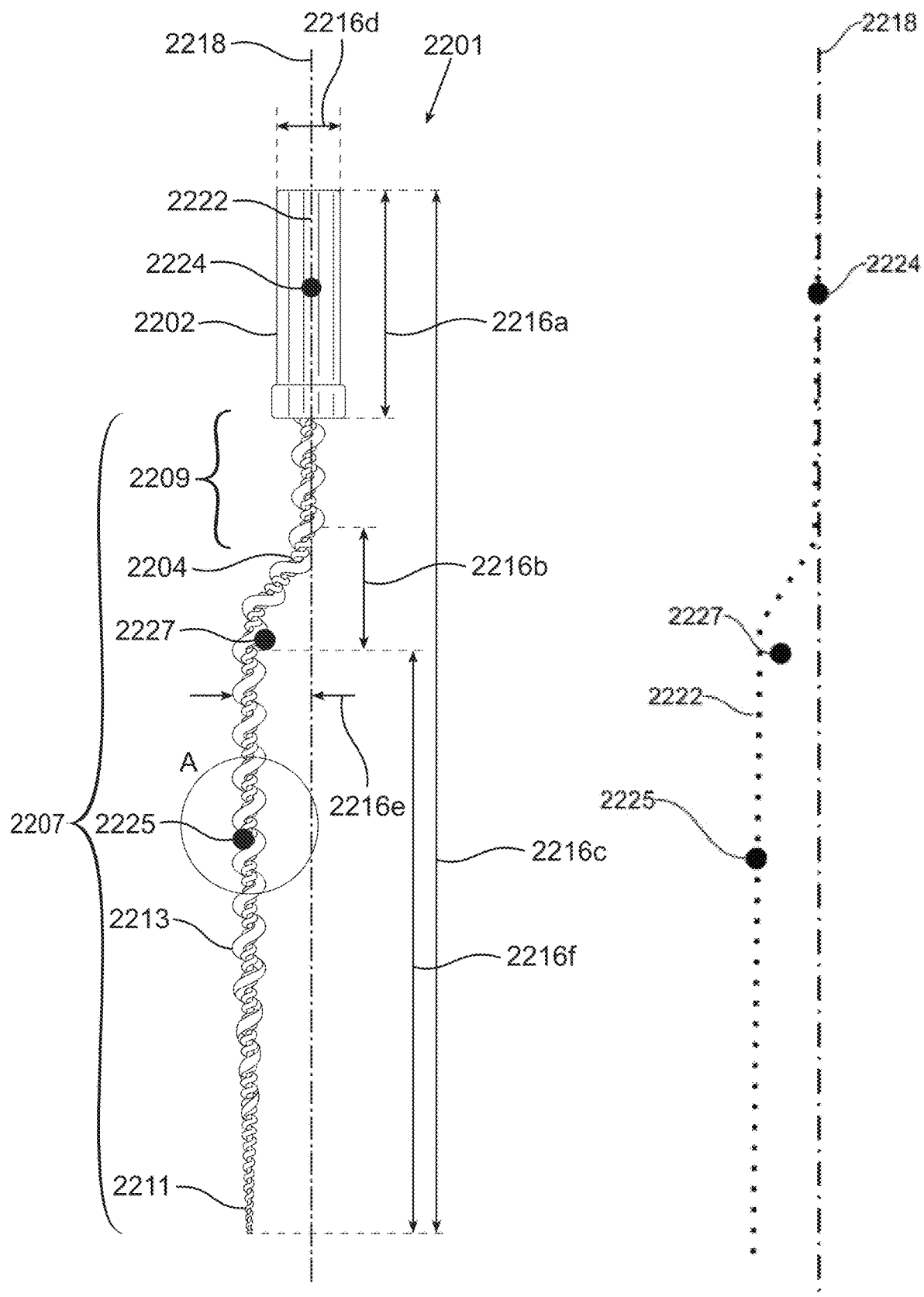
FIG. 22 is a schematic diagram of an eccentric endodontic file in accordance with an embodiment of the current invention.
FIG. 23 is a schematic illustration of the local and average center of gravity of an eccentric endodontic file in accordance with an embodiment of the current invention.

FIG. 21 is a flow chart illustration of preparing a kit including an eccentric endodontic file in accordance with an embodiment of the current invention. For example, an eccentric file (e.g., in accordance with any of the embodiments herein) may be provided 2101 for packaging. Optionally the file is provided 2101 in an unstressed state and/or an aseptic state and/or a clean state. Optionally the file is sterilized 2112 and/or packaged 2110. In some embodiments, the file may be sterilized 2112 and then packaged 2110 (for example autoclaved and then placed in a clean access tray in a clean room). Alternatively or additionally, the file may be packaged 2110 and then sterilized 2112 (for example using sterilization packaging and techniques as listed herein). In some embodiments a package may be closed. For example, closing may include sealing a package. A seal may be hermitic and/or may include a bacterial barrier and/or a filter. Optionally, sealing may include crimping, screwing a cap, gluing, heat sealing, folding, coating and/or shrink sealing FIG. 22 is a schematic diagram of an eccentric endodontic file 2201 in accordance with an embodiment of the current invention and FIG. 23 is a schematic illustration of the local and average center of gravity of an eccentric endodontic file in accordance with an embodiment of the current invention. The file of FIG. 22 may include a file as described in other embodiments herein Optionally the file 2201 includes a proximal handle 2202 having an axis of rotation 2218. Optionally, the file includes an active portion 2207 the active portion 2207 may include a central core 2211 and/or one or more helical wires 2213 wrapping the central core. Optionally, the central core includes a wire and/or a cable, for example made up of a plurality of thin strands. In some embodiments, the active portion 2207 may include a transition zone 2204 and/or an eccentric distal active portion 2206. Alternatively or additionally, the transition zone may include part of handle (for example, the active zone may be mounted to the handle eccentrically with respect to the axis of rotation of the handle e.g., at an angle to the axis of rotation and/or translated away from the axis of rotation).

In some embodiments, a handle 2202 may have width (e.g., a diameter 2216d) of between 1.3 to 2.9 mm and/or between 2.9 to 3.2 mm and/or between 3.2 to 3.5 mm and/or greater than 3.5 mm. For example, the handle 2202 may fit a 2 mm friction fitting and/or a 3.35 mm friction fitting. For example, the handle 2202 may have a length 2216a ranging between 5 to 9 mm and/or between 2 to 5 mm and/or between 9 to 15 mm. Optionally a handle 2202 may have an axis of rotation 2218. For example, the axis of rotation 2218 may pass through the centroid and/or the center of gravity 2224 of the handle. For example, the axis of rotation 2218 may correspond to the local center of mass 2222 of the handle 2202 along its length. Optionally in its unstressed shape, the distal active section 2206 is approximately straight. Alternatively or additionally, the in its unstressed shape, the distal active section 2206 may have a consistent second moment (e.g., it is curved in the same direction all along its length).

In some embodiments, a concentric portion 2209 of the active portion 2207 of the file 2201 may be concentric with the axis of rotation of the handle 2202. For example, the concentric portion 2209 may be located between the transition zone 2204 and the handle 2202. Alternatively, the transition zone may be connected directly and/or include part of the handle 2202. In some embodiments, as one moves distally along the transition zone 2204, the local center of mass 2222 of the file may become more distant from the axis of rotation 2218 of the handle 2202. For example, a transition zone may have a length 2216b ranging between 1 to 2 mm and/or between 2 to 6 mm and/or between 6 to 12 mm and/or 12 to 25 mm. Optionally the lateral displacement 2216e between the proximal beginning of the transition zone 2204 and the distal end of the transition zone 2204 may range between 0 to 1.5 mm and/or between 1.5 to 2.2 mm and/or between 2.2 mm to 4 mm and/or between 4 to 10 mm.

In some embodiments, a distal active region 2206 is located distal to the transition region 2204. For example, the distal active region 2206 may be connected to the handle via the transition region 2204. Optionally, the distal active region 2206 is approximately parallel to the axis of rotation 2218 of the handle when the file 2201 is unstressed. Alternatively or additionally, the distal active region 2206 may be angled and/or curved with respect to the axis of rotation 2218 of the handle when the file 2201 is unstressed. In some embodiments, the distal active region 2206 may be all on one side of the axis of rotation 2218. Optionally the length of the distal active section 2216f may range between 15 to 20 mm and/or between 5 to 15 mm and/or between 20 to 30 mm.

In some embodiments, the distance from the center of mass 2227 of the file 2201 to the axis of rotation 2218 of the handle 2202 is greater than the radius of the handle 2202 of the file. Alternatively or additionally, the distance from the center of mass 2227 of the file 2201 to the axis of rotation 2218 of the handle 2202 may be less than the radius of the handle 2202 of the file (for example between half the radius to the radius). In some embodiments, the distance from the center of mass 2225 of the distal active section 2206 of the file 2201 to the axis of rotation 2218 of the handle 2202 is greater than the radius of the handle 2202 of the file. Alternatively or additionally, the distance from the center of mass 2225 of the distal active section 2206 of the file 2201 to the axis of rotation 2218 of the handle 2202 may be less than the radius of the handle 2202 of the file (for example between half the radius to the radius). In some embodiments, the center of mass 2227 of the file 2201 is closer to the axis of rotation of the handle 2202 of the file than the center of mass 2225 of the distal active section 2206. In some embodiments, the center of mass 2227 of the file 2201 is closer to the axis of rotation of the handle 2202 of the file than the local center of mass 2222 of the file along the distal active section 2206 (e.g., for example distal of the transition section 2204 of the file). Optionally, the entire length of the file 2216c may range between 30 to 34 mm and/or between 20 to 30 mm and/or between 34 to 45 mm.

In some embodiments, the distal active section 2206 may be thinner and/or more flexible than some or all of the portions (e.g., the transition portion 2204 and/or the concentric portion 2209 and/or the handle 2202) of the file that are proximal thereto. Optionally, the distal active section 306 is tapered. For example, the distal active section may end at a tapered tip.

In some embodiments, the core 2211 may protrude out from one or more of the helical wires 2213. For example, at a distal end portion, the core 2211 may be exposed. For example, the core 2211 may include a multistranded cable that opens into a brush at the distal end of the device when the device is rotated in a particular direction. For example, the file may be inserted while rotating in a first direction and/or the direction of rotation may be reversed to open the strands at the distal end of the file to form a brush and/or clean the sides of the canal. Contact with a wall of the canal may further open the strands. Optionally, the distal portion of the file has a very small diameter and/or is flexible enough to enter very small apical portions of a canal. The rotating brush optionally activates disinfectant chemicals. Optionally, rotation of the brush may drive fluid (e.g., a disinfectant) into small pores (e.g., by creating turbulence, centrifugal forces, and/or by cleaning away films that block the small pores).

Figure 24:
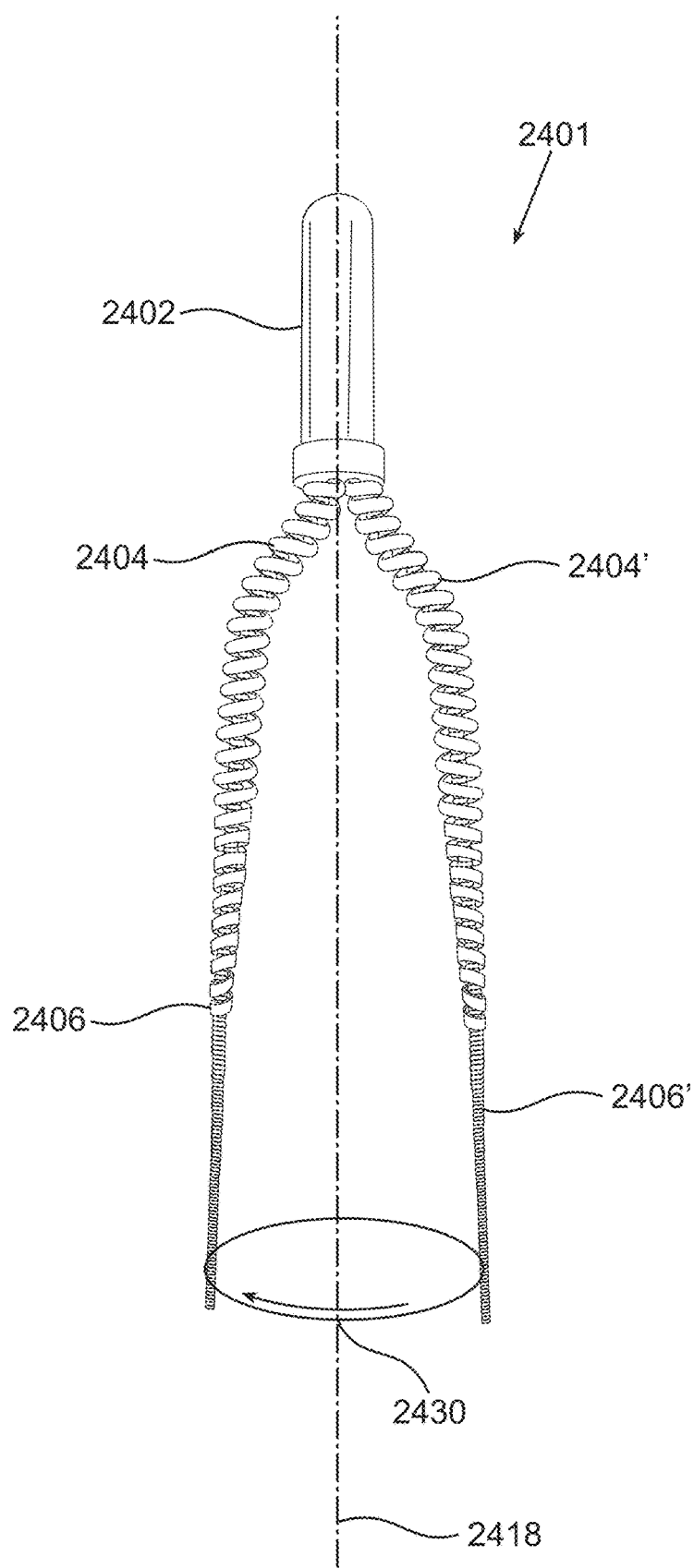
FIG. 24 is a schematic illustration whipping motion of an eccentric endodontic file in accordance with an embodiment of the current invention.

FIG. 24 is a schematic illustration whipping motion of an eccentric endodontic file in accordance with an embodiment of the current invention. In some embodiments, an axis of rotation 2418 of a file 2401 does not correspond to an axis of symmetry of the active portion (e.g., transitional region 2404 and/or distal active region 2406) of the file 2401. In some embodiments when a file 2401 is rotated 2430 around an axis of rotation 2418 of its handle 2402 centrifugal forces optionally stress a distal active region 2406 outward (e.g., away from the axis 2418 of rotation). Optionally, the whipping and/or spreading is distributed over the entire length of the transition region 2404 and/or distal active region 2406 of the file 2401. For example, as the transition region 2404 rotates between opposing positions 2404, 2404' and/or a distal active region 2406 rotates between opposing position 2406, 2406' the distal portion of the file 2401 may whip around and/or spread. For example, when the distal portion of the file 2401 is inside a canal the distal tip may whip around a large space within the confines of the canal and/or contact and/or clean the sides of the canal. This whipping movement may clean corners and/or hard to reach locations inside the canal. The whipping motion may also whip cleaning fluids inside the canal activating them and/or mixing them deeper into the canal e.g., for cleaning and/or disinfecting the channel In some embodiments, the transitional section 2304 is directly attached to the handle 2402 if the file.

Figure 25A:
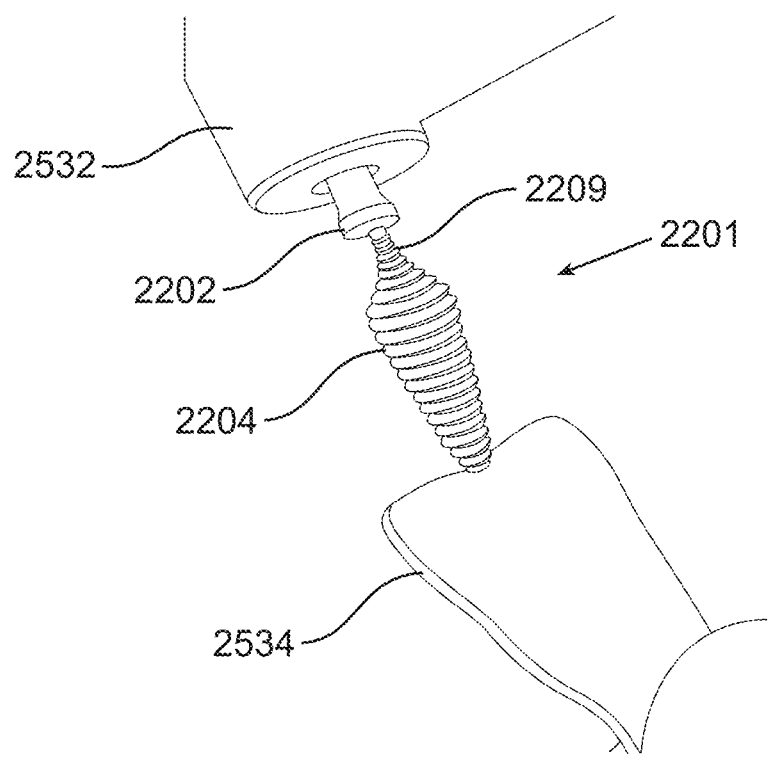
FIG. 25A is a schematic illustration of an eccentric endodontic file inserted shallowly into a canal in accordance with an embodiment of the current invention.
Figure 25B:
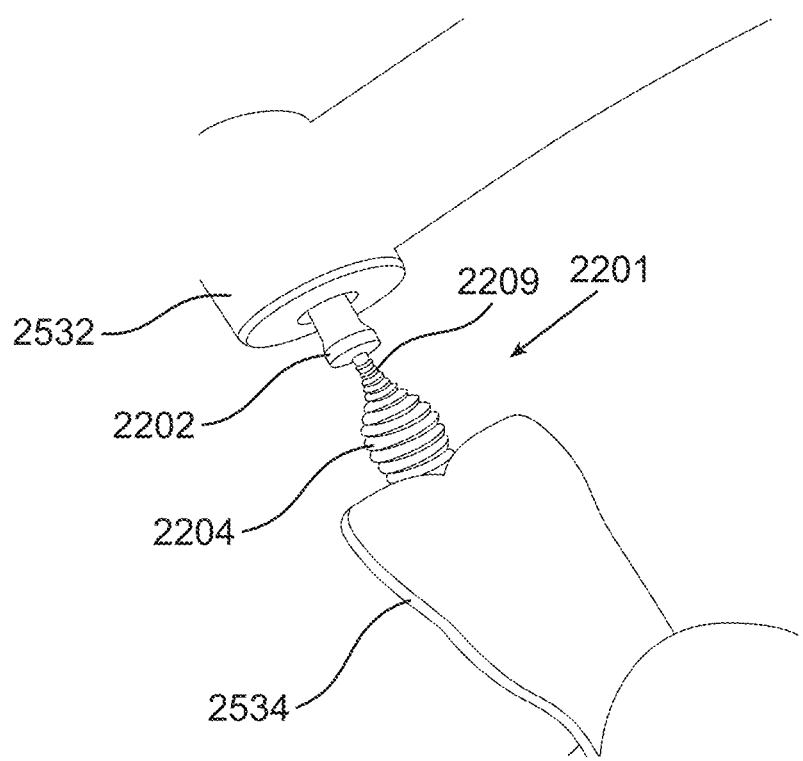
FIG. 25B is a schematic illustration of an eccentric endodontic file inserted deeply into a canal in accordance with an embodiment of the current invention.

FIG. 25A is a schematic illustration of an eccentric endodontic file inserted shallowly into a canal in accordance with an embodiment of the current invention and FIG. 25B is a schematic illustration of an eccentric endodontic file 2201 inserted deeply into a canal in a tooth 2534 and rotated by a dental handpiece 2532 in accordance with an embodiment of the current invention. In some embodiments, the whipping action of a file 2201 adjusts itself to a space and/or a geometry in a canal. For example, a file 2201 is inserted into a canal, the active portion of the file proximal to the canal (e.g., transitional portion 2204) whips around and/or causes a more distal portion to rub against the edges of the large opening of the canal. The whipping of the transitional portion 604 outside the canal optionally also causes a whipping motion of the distal portion insides the canal. The whipping motion optionally affects all portions of the distal active portion of the file 2201 is a similar fashion. For example, this may cause the file 2201 to contact the wall all along its distal active section. In some embodiments, the curvature and/or the flexibility and/or bending forces cause the volume of each portion of the file to expand (e.g., as the file elastically buckles) to fill the canal and/or scrape around the edges all around the canal.

Figure 26A:
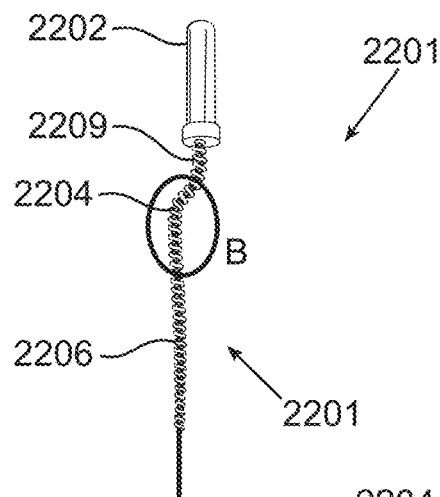
FIG. 26A is a low magnification image of an eccentric endodontic file in accordance with an embodiment of the current invention.
Figure 26B:
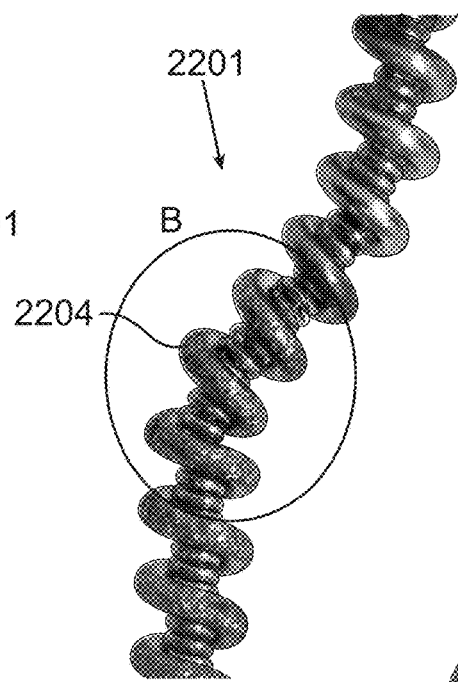
FIG. 26B is a medium magnification image of an eccentric endodontic file in accordance with an embodiment of the current invention.
Figure 26C:
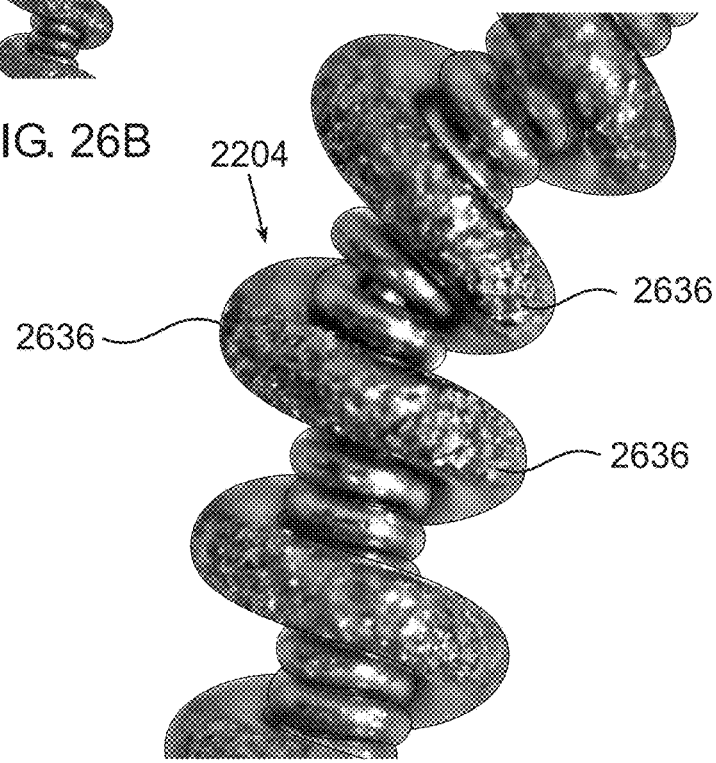
FIG. 26C is a high magnification image of an eccentric endodontic file in accordance with an embodiment of the current invention.

FIG. 26A is a low magnification image of an eccentric endodontic file 2201 in accordance with an embodiment of the current invention and FIG. 26B is a medium magnification image of an eccentric endodontic file 2201 in accordance with an embodiment of the current invention and FIG. 26C is a high magnification image of section B (as indicated in FIGS. 26A and 26B) of an eccentric endodontic file after use in accordance with an embodiment of the current invention. It can be seen that the whipping of the file causes approximately even wear of the abrasive surface of the file. For example, movement of the file may cause whipping and/or spreading and/or contact with the surface of a canal all along an active portion of the file. For example, when an axis of rotation of a file 2201 does not correspond to the center of mass of the active portion of the file, centrifugal may push the active part against the walls of a canal all along its length. For example, the center of mass of a distal active portion of the file 2201 may run approximately parallel to the axis of rotation. Optionally centrifugal movement and/or whipping produces a centrifugal force between the active portion of the file and the walls of the canal. Optionally this force is distributed all along the distal active portion of the file. For example, rotation rate of an eccentric file may range between 4000 to 5500 RPM and/or between 5500 to 7500 RPM and/or between 7500 to 9500 RPM. Optionally, file 2201 resists material fatigue and/or concentration of stress (for example due to its flexibility and/or springiness, its even contact with the canal and/or the approximately constant distance between the unstressed active portion of the file and the axis of rotation). In some embodiments, the flexible spiral design of the active region of the file 2201 under stress equalizes pressures and facilitates movement of structures on the file. For example, the dynamic load, bending, elastic buckling and/or flexing of the file may cause different parts of the file to contact the walls of the canal at different times. This may facilitate even where and distribution of stress.

Figure 27A:
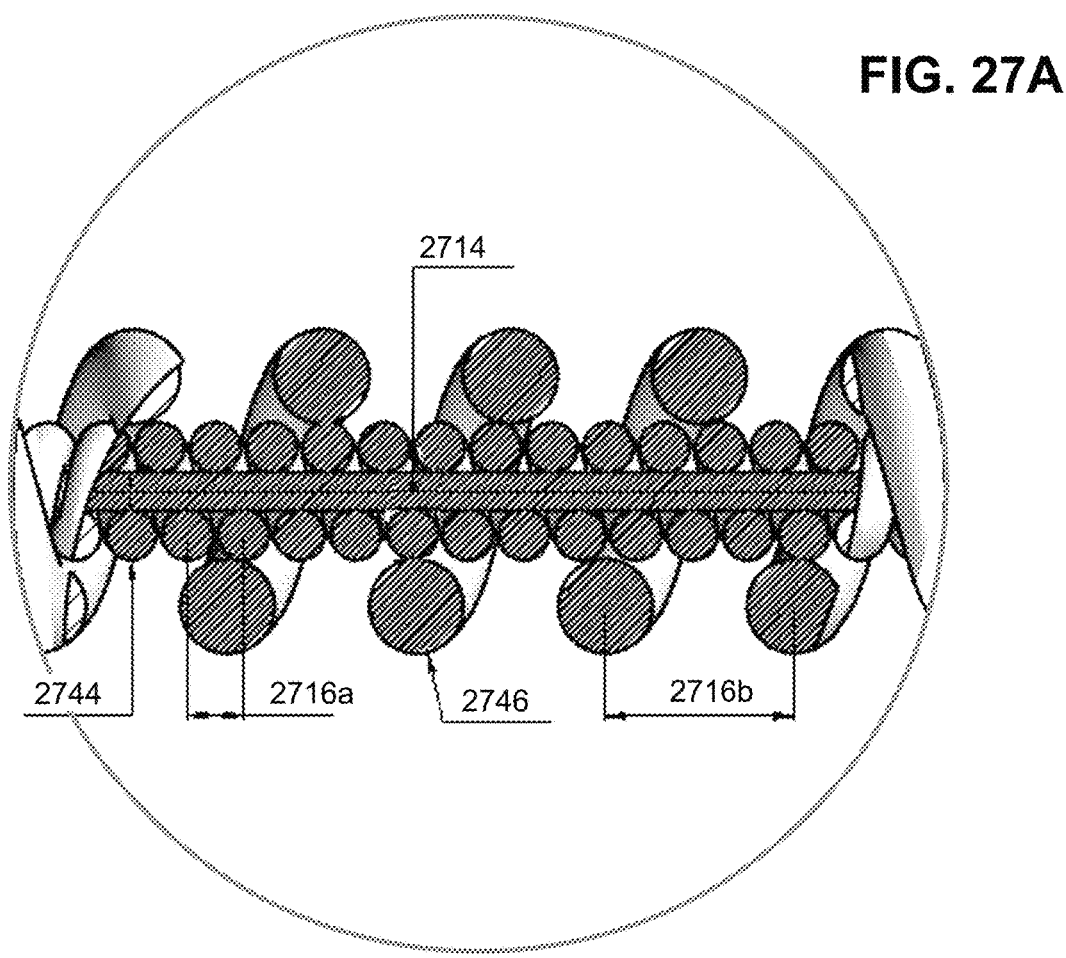
FIG. 27A is a highly magnified schematic illustration of a longitudinal cross section of a three layer eccentric endodontic file in accordance with an embodiment of the current invention.

FIG. 27A is a highly magnified schematic illustration of a longitudinal cross section (section A of FIG. 22) of an eccentric endodontic file in accordance with an embodiment of the current invention. In some embodiments, the structure of an active portion of a file may include a central core 2714 (e.g., the diameter of the core may range for example between 0.05 to 0.2 mm and/or between 0.01 to 0.05 mm and/or between 0.2 to 0.4 mm). Optionally, the core 2714 may include a single wire and/or multiple thin strands. For example, each strand may have a diameter between 0.01 to 0.05 mm and/or between 0.05 to 0.1 mm and/or between 0.1 to 0.2 mm. The strands are optionally twisted together. For example, the strands may be twisted in an opposite direction from a helical wire 2744 and/or 2746. Alternatively or additionally, the strands may be wound in the same direction as a helical wire 2744 and/or 2746. Optionally a medium diameter wire 2744 (e.g., of diameter ranging between 0.05 to 0.1 and/or between 0.1 to 0.25 and/or between 0.25 to 0.5 mm) is wrapped tightly around the core 2714 (e.g., the distance 2716a between windings may range between 100% to 110% and/or between 110% to 130% and/or between 130% to 150% and/or between 150% to 200% the diameter of the medium wire 2744). Optionally a thick diameter wire 2746 (e.g., of diameter ranging between 0.1 to 0.2 and/or between 0.2 to 0.5 and/or between 0.5 to 1 mm) is wrapped loosely around the medium wire 2744 (e.g., the distance 2716b between windings may range between 120% to 150% and/or between 150% to 200% and/or between 200% to 400% and/or between 400% to 900% the diameter of the thick wire 2746). Optionally near the tip of the file the core 2714 and/or wires 2744, 2746 may be tapered. Alternatively or additionally, near the distal tip of the file, the thick wire 2746 may be missing and/or the medium wire may be missing. Optionally, one or all of the core 2714 and/or the outer wire (e.g., wire 2746 in section A and/or wire 2744 and/or core 2714) near the tip may be treated to have surface roughness (e.g., as illustrated in FIG. 26C). Optionally, at the tip, the strands of the core 2714 may be free (e.g., to form a brush) and/or fused (e.g., to form a file).

Figure 27B:
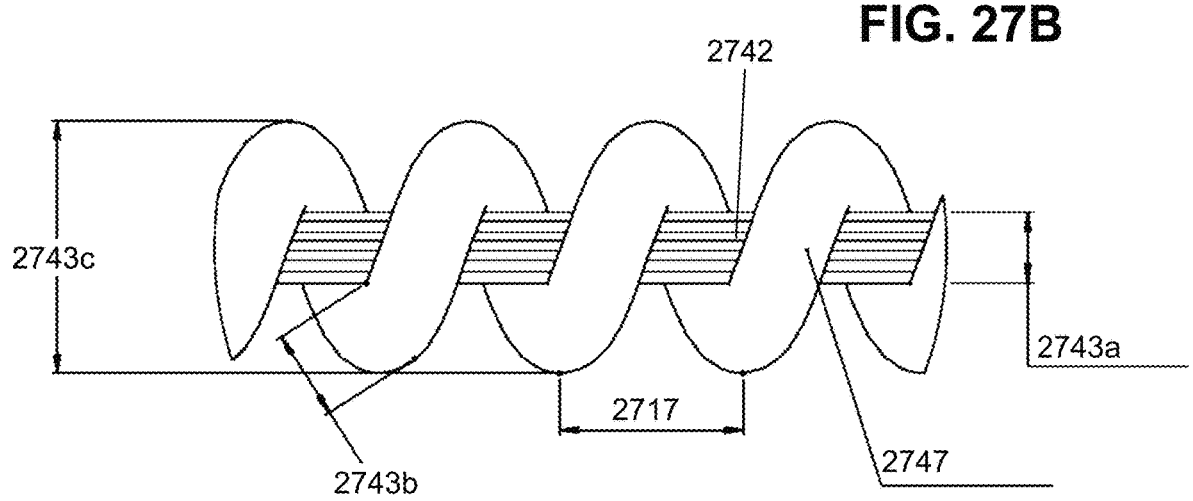
FIG. 27B is a highly magnified schematic illustration of a longitudinal cross section of a two layer eccentric endodontic file in accordance with an embodiment of the current invention.

FIG. 27B is a highly magnified schematic illustration of a longitudinal view of an eccentric endodontic file having a two layer structure in accordance with an embodiment of the current invention. Any of the embodiments of files and/or brushes described herein may be made with a two layer structure and/or a three layer structure. In some embodiments, the structure of an active portion of a file may include a central core 2742 (e.g., the diameter 2743 of the core 2742 may range for example between 0.1 to 0.3 mm and/or between 0.01 to 0.1 mm and/or between 0.3 to 0.5 mm). Optionally, the core may include a single wire and/or multiple thin strands. For example, the core 2742 may include between 4 and 10 strands and/or between 1 to 4 strands and/or between 10 to 30 strands. For example, each strand may have a diameter between 0.03 to 0.1 mm and/or between 0.1 to 0.2 mm and/or between 0.01 to 0.03 mm. The strands are optionally twisted together. For example, the strands may be twisted in an opposite direction from a helical wire 2747. Alternatively or additionally, the strands may be wound in the same direction as a helical wire 2747. Optionally a helical wire 2747 may have diameter for example ranging between 0.05 to 0.1 and/or between 0.1 to 0.25 and/or between 0.25 to 0.5 mm and/or 0.5 to 1.0 mm) is wrapped around the core 2742 (e.g., the distance 2747 between windings may range between 100% to 110% and/or between 110% to 130% and/or between 130% to 150% and/or between 150% to 200% and/or between 200% to 400% and/or between 400% to 900% the diameter of the wire 1047). Optionally near the tip of the file the core 2742 and/or wire 2747 may be tapered. Alternatively or additionally, near the distal tip of the file, the helical wire 2747 may be missing. Optionally, one or all of the core 2742 and/or the helical wire 2747 near the tip may be treated to have surface roughness (e.g., as illustrated in FIG. 26C). Optionally, at the tip, the strands of the core 2742 may be free (e.g., to form a brush) and/or fused (e.g., to form a file).

Figure 28A:
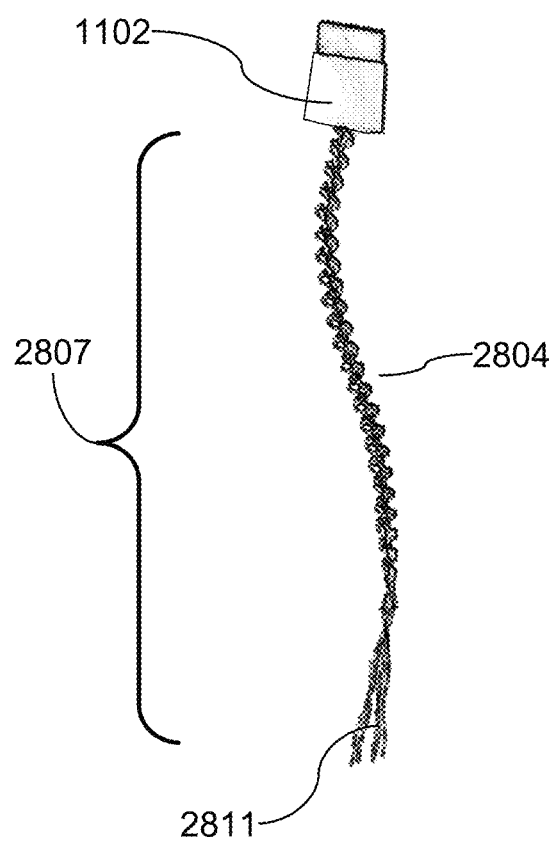
FIG. 28A is a schematic illustration of an undulating file with a brush end in accordance with an embodiment of the current invention.

FIG. 28A is a schematic illustration of an undulating file with a brush tip in accordance with an embodiment of the current invention.

In some embodiments, the file includes strands 2811 that serve as a brush to clean a canal and/or to stir fluid in a canal. For example, a core of the file may include a cable with multiple strands. Optionally, on a body 2807 of the file the core is surrounded by one or more helical wires 2804. In some embodiments, the core and/or the helical wire 2804 may be wind in the same direction. Rotating the file in one direction may wind the helical wire 2804 and/or tighten a winding of the core. This may facilitate the file penetrating into a canal. Option, rotating the file in an opposite direction opens the strands 2811 and/or may spread the helical wire 2804. For example, opening strands 2811 may form a brush to clean structures (for example thin channels and/or pores) in an apical portion of the canal. Opening the helical wire 2804 may enhance scraping the walls of a proximal portion of the canal. Alternatively or additionally, rotating the brush optionally crumbles debris and/or residue in a canal and/or scrubs the walls of the canal. Optionally, the file may have a multistranded structure that makes it resistant to stress and/or facilitating high speed rotation while cleaning a canal. For example, 5, 26A to 26C and/or 10. the structure of the file may be as described herein above with respect to FIGS. Optionally, the file may include a proximal adapter 2802 that fits to a dental handpiece. For example, the handpiece may rotate the file at a rate of between 5500 to 7500 RPM and/or between 3000 to 5500 RPM and/or between 2000 to 5500 RPM and/or between 7500 to 11000 RPM.

In some embodiments, a single file and/or a pair of files may be used to clean an entire root canal. For example, a file may include a distal strands 2811 that form a brush to clean an apical portion of a canal. The strands 2811 optionally simultaneously clean walls of the canal and/or activate fluid in the canal. For example, the spinning strands 2811 may produce turbulent forces that push liquid (e.g., disinfectant) throughout the canal and/or to the sides of the canal. Additionally or alternatively, the strands 2811 scratch and/or remove biofilm and/or other coatings that was shield infecting organisms against the attack by the disinfectant. Optionally, this cleaning may facilitate the disinfectant to penetrate through a biofilm layer and/or to eliminate bacteria.

In some embodiments, the body 2807 of the file may clean the outer portion of the canal. For example, the file may be highly flexible such that it whips around and/or bends and/or folds inside the canal filling the space and/or scraping the walls of the canal and/or activating disinfectant fluid in the canal. Optionally, the rotating spiral winding on the file may evacuate debris from the canal. Optionally, cleaning of the external portion may be simultaneous to the cleaning of the apical portion. Optionally, the file may have an eccentric configuration, for example as illustrated in FIG. 22. The eccentric configuration may be advantageous for example for producing a whipping movement to clean large open area near the entrance to a canal. Alternatively or additionally, the file may have a serpentine geometry (for example as illustrated in FIG. 28A. For example, the serpentine configuration may include a curvature over all and/or most of the length of the file (e.g., in a resting state more the 10% of file may be curved and/or between 10 to 25% and/or between 25 to 50% and/or between 50 to 75% and/or between 5 to 10% and/or between 2 to 5%). The serpentine geometry may facilitate elastic buckling of the file under axial pressure (e.g., as a dentist pushes the file into the channel). The springiness of the file and/or the buckling may buffer axial forces. limiting the force on the distal point of the file (e.g., inhibiting pushing the distal end of the file out of the canal into sensitive tissue around the tooth). The buckling all along the file may optionally push the file outward along the length of the file filing the sides of the canal. This may be especially useful in cleaning a middle portion of the canal (e.g., between an apical portion and an outer portion). Optionally, the springy curved structure of the serpentine file also redistributes forces so that high local sideways force created bucking pushing a portion against a location of the wall are distributed along the file causing buckling in another location inhibiting very high concentrated local forces that may damage and/or crack the walls of the canal. Optionally a radius of curvature of the curved portion of the body of the file at rest may range between 1 to 3 mm and/or between 3 to 10 mm and/or between 10 to 30 mm and/or between 30 to 50 mm and/or between 50 to 100 mm and/or between 100 to 300 mm. Optionally the file may be flexible enough to buckle elastically to a radius of curvature ranging between 0.2 to 1 mm and/or between 1 to 2 mm and/or between 2 to 4 mm and/or between 4 to 8 mm and/or between 8 to 16 mm. In some embodiments, an undulating file with a brush tip will have a 3 layer structure (e.g., as illustrated in FIG. 27A). Alternatively, or additionally, an undulating file with a brush tip may have a 2 layer structure (e.g., as illustrated in FIG. 27B).

Figure 28B:
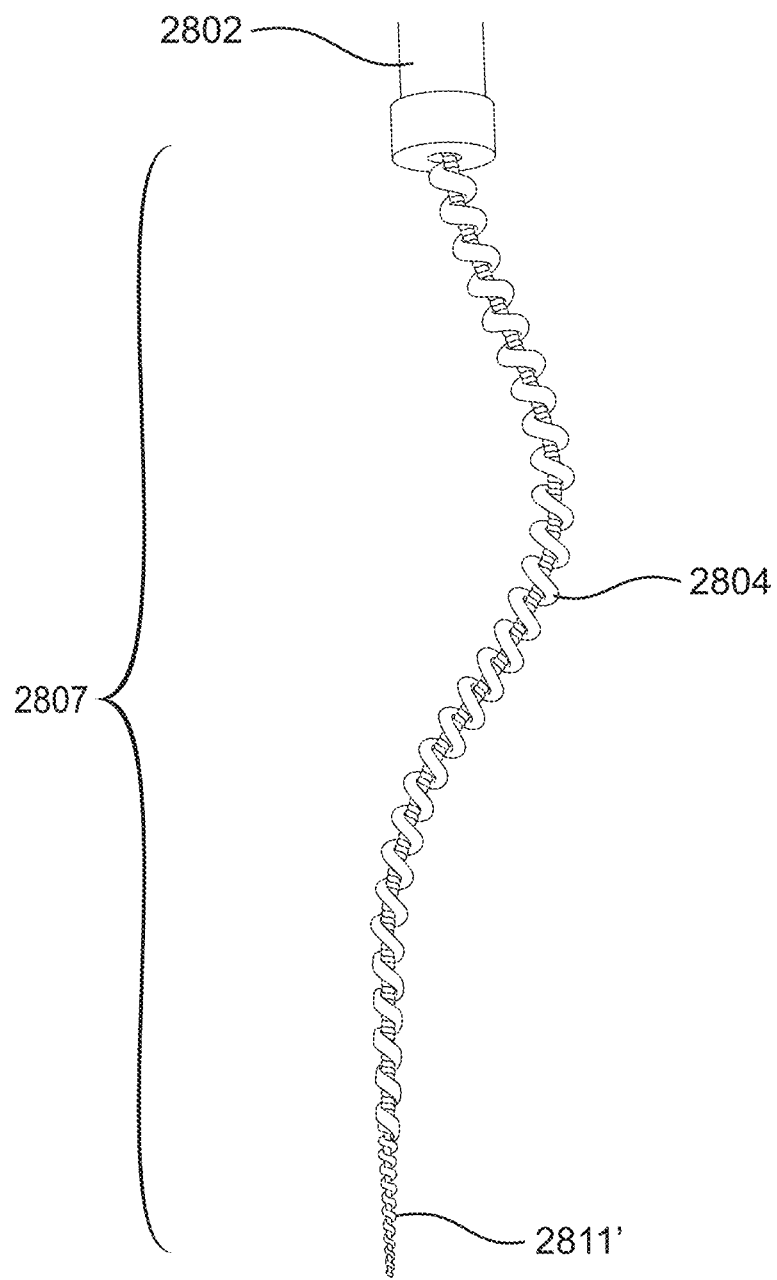
FIG. 28B is a schematic illustration of an undulating file with a closed tip in accordance with an embodiment of the current invention.

FIG. 28B is a schematic illustration of an undulating file in accordance with an embodiment of the current invention. Optionally, the file includes a closed tip (e.g., rather than a brush). In some embodiments, an undulating file will have a 3 layer structure (e.g., as illustrated in FIG. 27A). Alternatively or additionally, an undulating file may have a 2 layer structure (e.g., as illustrated in FIG. 27B).

In some embodiments, the file tip is a closed file 2811' that serve to penetrate and/or clean a canal. For example, a core of the file may include a cable with multiple strands. Optionally, on a body 2807 of the file the core is surrounded by one or more helical wires 2804. In some embodiments, the core and/or the helical wire 2804 may be wind in the same direction. Rotating the file in one direction may wind the helical wire 2804 and/or tighten a winding of the core. This may facilitate the file penetrating into a canal. Optionally, the file may have a multistranded structure that makes it resistant to stress and/or facilitating high speed rotation while cleaning a canal. For example, 22, 26A to 26C and/or 27. the structure of the file may be as described herein above with respect to FIGs. Optionally, the file may include a proximal adapter 2802 that fits to a dental handpiece. For example, the handpiece may rotate the file at a rate of between 5500 to 7500 RPM and/or between 3000 to 5500 RPM and/or between 2000 to 5500 RPM and/or between 7500 to 11000 RPM.

In some embodiments, the body 2807 of the file may clean the outer portion of the canal. For example, the file may be highly flexible such that it whips around and/or bends and/or folds inside the canal filling the space and/or scraping the walls of the canal and/or activating disinfectant fluid in the canal. Optionally, the rotating spiral winding on the file may evacuate debris from the canal. Optionally, cleaning of the external portion may be simultaneous to the cleaning of the apical portion. Optionally, the file may have an eccentric configuration, for example as illustrated in FIG. 22. The eccentric configuration may be advantageous for example for producing a whipping movement to clean large open area near the entrance to a canal. Alternatively or additionally, the file may have a serpentine geometry (for example as illustrated in FIG. 28B. For example, the serpentine configuration may include a curvature over all and/or most of the length of the file (e.g., in a resting state more the 10% of file may be curved and/or between 10 to 25% and/or between 25 to 50% and/or between 50 to 75% and/or between 5 to 10% and/or between 2 to 5%). The serpentine geometry may facilitate elastic buckling of the file under axial pressure (e.g., as a dentist pushes the file into the channel). The springiness of the file and/or the buckling may buffer axial forces. limiting the force on the distal point of the file (e.g., inhibiting pushing the distal end of the file out of the canal into sensitive tissue around the tooth). The buckling all along the file may optionally push the file outward along the length of the file filing the sides of the canal. This may be especially useful in cleaning a middle portion of the canal (e.g., between an apical portion and an outer portion). Optionally, the springy curved structure of the serpentine file also redistributes forces so that high local sideways force created bucking pushing a portion against a location of the wall are distributed along the file causing buckling in another location inhibiting very high concentrated local forces that may damage and/or crack the walls of the canal. Optionally a radius of curvature of the curved portion of the body of the file at rest may range between 1 to 3 mm and/or between 3 to 10 mm and/or between 10 to 30 mm and/or between 30 to 50 mm and/or between 50 to 100 mm and/or between 100 to 300 mm. Optionally the file may be flexible enough to buckle elastically to a radius of curvature ranging between 0.2 to 1 mm and/or between 1 to 2 mm and/or between 2 to 4 mm and/or between 4 to 8 mm and/or between 8 to 16 mm.

Figure 29:
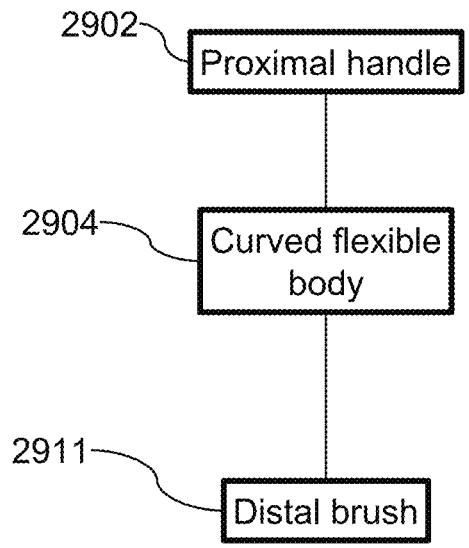
FIG. 29 is a block diagram of a bent file in accordance with an embodiment of the current invention.

FIG. 29 is a block diagram of a bent file in accordance with an embodiment of the current invention. In some embodiments, an endodontic file includes a proximal handle 2902, for example, configured to fit a dental handpiece. Optionally the file includes a curved body 2904. For example, the curvature of the body 2904 may be serpentine and/or eccentric. Optionally, the body may include a core and/or a spiral winding, for example as illustrated in previous embodiments herein. For example, the core may include a cable of multiple strands and/or the spiral winding may wrap the core and/or may include a wire and/or may include a rough coating. Optionally, a distal portion of the file may be configured to form a brush 2911. For example, the brush 2911 may be formed by a distal portion of the core cable extending distally past the spiral winding.

Figure 30:
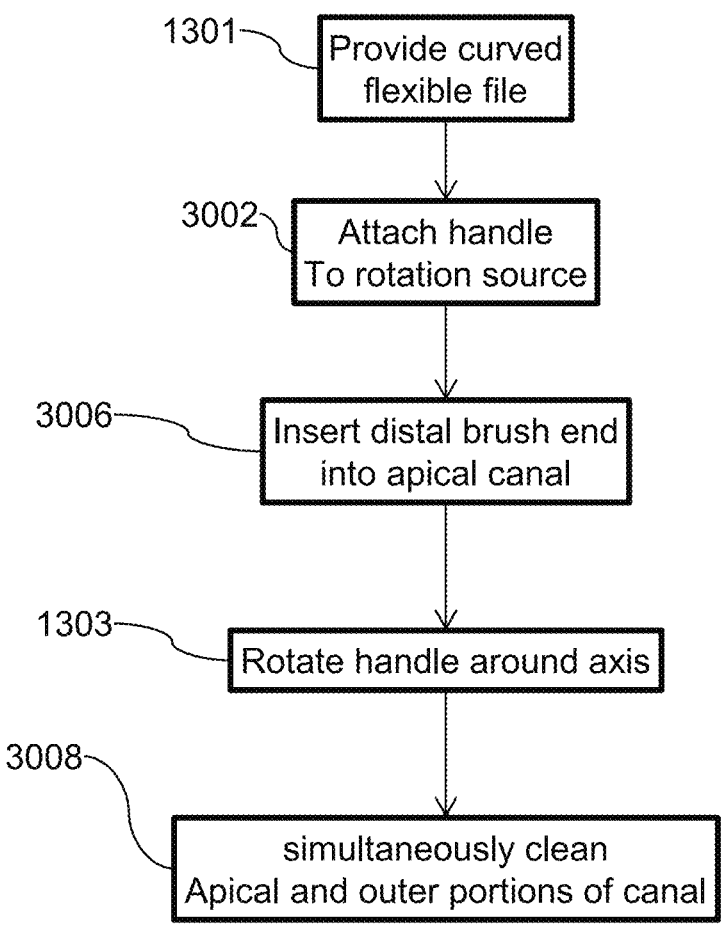
FIG. 30 is a flow chart illustration of a method of cleaning a canal in accordance with an embodiment of the current invention.

FIG. 30 is a flow chart illustration of a method of cleaning a canal in accordance with an embodiment of the current invention. In some embodiments, a curved flexible file (for example as described herein in previous embodiments) may be supplied 3001. A handle of the file is optionally attached 3002 to a dental handpiece. A distal brush of the file may be inserted 3006 into an apical portion of a canal. Optionally the handle and/or file is rotated 3003 by the handpiece and/or the rotating file may simultaneously clean 3008 the apical portion of the canal and/or a middle portion and/or an outer portion of the canal. For example, the brush of the file may open up in the apical portion scraping the walls of the canal and/or causing turbulence in a disinfectant fluid. For example, the curved body of the file may whip around and/or buckle inside an outer portion of the canal scraping the walls of the canal and/or causing turbulence in a disinfectant fluid. For example, the file may be inserted 3006 while rotating in a first direction and/or the direction of rotation may be reversed to open the strands at the distal end of the file to form a brush and/or clean 3008 the sides of the canal. Optionally, axial force may be applied to cause the file to buckle and clean 3008 the sides of the outer part of the canal.

Figure 31:
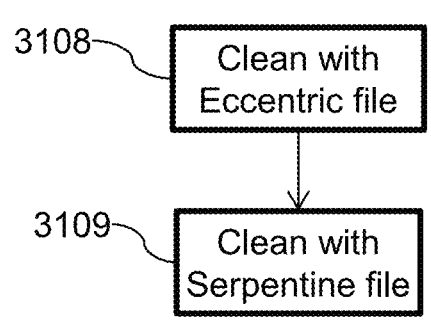
FIG. 31 is a flow chart illustration of a twostep method of cleaning a canal in accordance with an embodiment of the current invention.

FIG. 31 is a flow chart illustration of a twostep method of cleaning a canal in accordance with an embodiment of the current invention. In some embodiments, an eccentric file (for example as described in previous embodiments) may be used for rough cleaning 3108 of a canal. for example, the eccentric for of the file may allow enhanced whipping and/or cleaning 3108 in large openings in an external portion of the canal. Optionally the eccentric file may include a brush to clean 3108 an apical portion of the canal. Optionally, the outer portion and/or the apical portion may be cleaned 3108 simultaneously. Optionally, a serpentine file (for example as described in previous embodiments) may be used to further clean 3109 the canal. For example, a flexible buckling portion of the serpentine file may be advantageous for cleaning 3109 a middle portion (between the external portion and the apical portion) of the canal. Optionally the serpentine file may include a brush to clean 3109 an apical portion of the canal. Optionally, the middle portion and/or the apical portion may be cleaned 3109 simultaneously.

Figure 32:
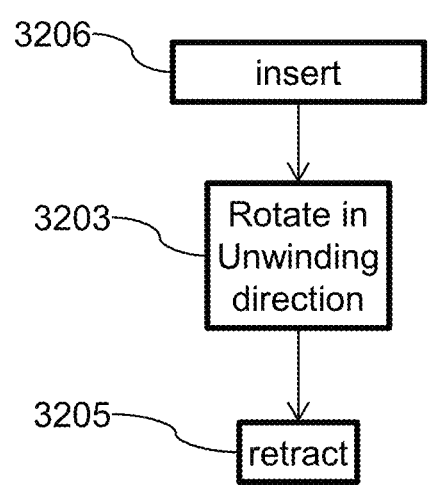
FIG. 32 illustrates a method of cleaning a channel in accordance with an embodiment of the current invention.

FIG. 32 illustrates a method of cleaning a channel in accordance with an embodiment of the current invention. The instant Inventor has observed that in some cases, reversing rotation may result in damage to a canal. For example, rotating an outer winding against the winding direction of an outer winding may sometimes cause a stiff wire of the outer winding to protrude and/or damage the canal. In some embodiment, a brush and/or file may be used without reversing rotation. For example, the brush may be inserted 3206 without rotation. Optionally, once the file is in place with a brush in an apical portion of the canal, the brush may be rotated 3203 in a direction opposite the winding. For example, the brush may be twisted in a direction opposite the twisting of an outer winding. Alternatively or additionally, the brush may be twisted in a direction similar to the twisting of an outer winding. For example, this may open the brush for cleaning the apical portion of the canal without opening the outer winding. Optionally, the sides of the outer winding may be roughened and/or the tool may eccentric and/or bent, for example to clean the walls of a proximal portion of the canal. For example, the brush and/or the sides of the outer winding may clean the canal during rotation and/or retraction 3205 from the canal.

Figure 33:
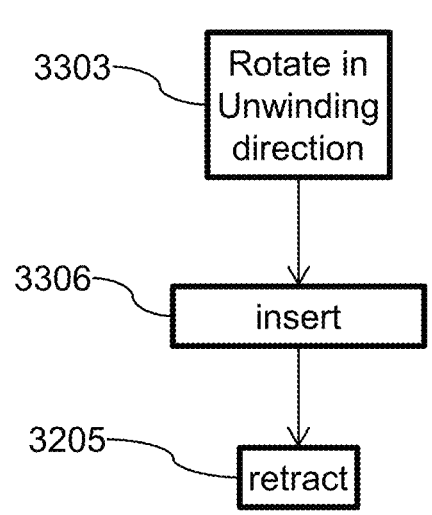
FIG. 33 illustrates a method of cleaning a channel in accordance with an embodiment of the current invention.

FIG. 33 illustrates a method of cleaning a channel in accordance with an embodiment of the current invention. For example, the brush may be inserted 3306 while rotating 3303 in a direction opposite the winding of the brush. Alternatively or additionally, the brush may be twisted in a direction similar to the twisting of an outer winding. For example, the brush may be twisted in a direction opposite the twisting of an outer winding In some embodiment, a brush and/or file may be used without reversing rotation. For example, the brush may be flexible enough to enter an apical portion of the canal even when open and/or rotating 3306 opposite its twist. For example, the brush may be twisted in a direction opposite the twisting of an outer winding. For example, this may open the brush for cleaning the apical portion of the canal without opening the outer winding. Optionally, the sides of the outer winding may be roughened and/or the tool may eccentric and/or bent, for example to clean the walls of a proximal portion of the canal. For example, the brush and/or the sides of the outer winding may clean the canal during rotation 3303 and/or during retraction 3205 from the canal and/or during insertion 3306 into the canal.

Figure 34:
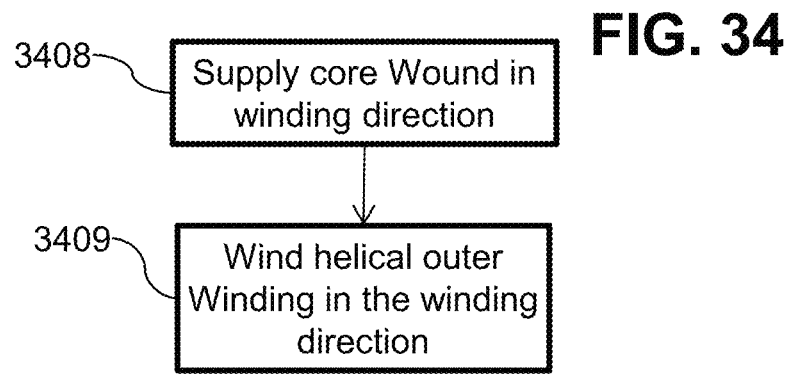
FIG. 34 illustrates a method of manufacturing an endodontic brush and/or file in accordance with an embodiment of the current invention.

FIG. 34 illustrates a method of manufacturing an endodontic brush and/or file in accordance with an embodiment of the current invention. For example, a core may be supplied 3408 and/or twisted in a twisting direction (optionally the core may include a cable of strands all twisted in a single direction and/or a compound cable with strands twisted in different directions, for example the twisting direction of the core is the twisting direction of the innermost twisted strands). Optionally, an outer winding will be wound 3409 around the core in same twisting direction of the core.

Figure 35:
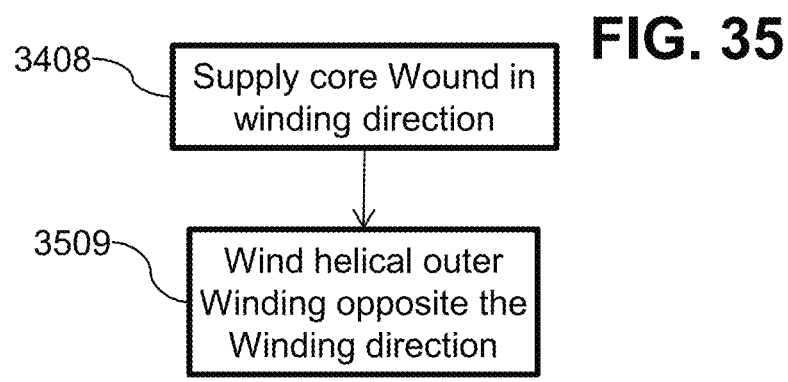
FIG. 35 illustrates a method of manufacturing an endodontic brush and/or file in accordance with an embodiment of the current invention.

FIG. 35 illustrates a method of manufacturing an endodontic brush and/or file in accordance with an embodiment of the current invention. For example, a core may be supplied 3408 and/or twisted in a twisting direction (optionally the core may include a cable of strands all twisted in a single direction and/or a compound cable with strands twisted in different directions, for example the twisting direction of the core is the twisting direction of the innermost twisted strands). Optionally, an outer winding will be wound 3509 around the core a direction opposite the twisting direction of the core.

It is expected that during the life of a patent maturing from this application many relevant technologies, will be developed and the scope of the terms for design elements, analysis routines, user devices is intended to include all such new technologies a priori.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An endodontic brush comprising:
   a coupler for coupling to a handpiece;

a central longitudinal flexible core supported at a handpiece end by said coupler; and a distal tip of the core including a plurality of strands being wound in a winding direction and unbonded so that during use when the brush is rotated in a direction opposite to said winding direction the strands unwind and open to form a brush, and a helical wire at least partially surrounding the core and extending distally toward the distal tip of the core opposite a handle end of the endodontic brush and wherein the distal tip of the core protrudes distally beyond a distal end of the helical wire and wherein a transitional portion at the distal end of the helical wire is unwound from the core.

2. The endodontic brush of claim 1, wherein a surface of said helical wire is roughened.

3. The endodontic brush of claim 1, wherein a distal portion is stretched longitudinally and narrowed laterally.

4. The endodontic brush of claim 1, wherein winding on said helical wire near said transitional portion is loosened compared to an intermediate portion of said helical wire.

5. The endodontic brush of claim 1, wherein said distal end of said helical wire is oriented parallel to said longitudinal flexible core.

6. The endodontic brush of claim 2, wherein an intermediate portion of said endodontic brush is bent.

7. The endodontic brush of claim 1, wherein said tip of the core is cut along a line directed at an angle of between 10 to 80 degrees to an axis of the core.

8. The endodontic brush of claim 1, wherein said tip of the core is cut using an abrasive cutter.

9. The endodontic brush of claim 1, wherein a proximal portion of the flexible core is bent inside said coupler.

10. The endodontic brush of claim 1, wherein an intermediate portion of said brush is roughened.

11. The endodontic brush of claim 1, wherein a width of said transitional portion is between 0.25 to 0.7 mm.

12. The endodontic brush of claim 1, wherein a width of said transitional portion is between 0.7 to 1.0 mm.

* * * * *